(12) United States Patent
Zhibin

(10) Patent No.: US 10,357,727 B2
(45) Date of Patent: Jul. 23, 2019

(54) WATER FILTER

(71) Applicant: Hong Kong Ecoaqua Co., Limited, Hong Kong (CN)

(72) Inventor: Zou Zhibin, Qingdao (CN)

(73) Assignee: HONG KONG ECOAQUA CO., LIMITED, Hong Kong (CN)

( * ) Notice: Subject to any disclaimer, the term of this patent is extended or adjusted under 35 U.S.C. 154(b) by 0 days.

(21) Appl. No.: 15/200,697

(22) Filed: Jul. 1, 2016

(65) Prior Publication Data

US 2018/0001241 A1   Jan. 4, 2018

(51) Int. Cl.
*B01D 35/30* (2006.01)
*B01D 35/153* (2006.01)

(52) U.S. Cl.
CPC .......... *B01D 35/30* (2013.01); *B01D 35/153* (2013.01); *B01D 2201/301* (2013.01); *B01D 2201/302* (2013.01); *B01D 2201/304* (2013.01); *B01D 2201/4015* (2013.01); *C02F 2201/006* (2013.01); *C02F 2307/10* (2013.01)

(58) Field of Classification Search
CPC ........ B01D 2201/301; B01D 2201/302; B01D 2201/304; B01D 2201/4015; B01D 35/153; B01D 35/30; C02F 2201/006; C02F 2307/10
See application file for complete search history.

(56) References Cited

U.S. PATENT DOCUMENTS

| | | | | |
|---|---|---|---|---|
| 4,780,197 | A | * | 10/1988 | Schuman ............... B01D 29/21 210/136 |
| 2007/0227959 | A1 | | 10/2007 | Sinur et al. |
| 2008/0047889 | A1 | | 2/2008 | Huda |
| 2010/0170841 | A1 | | 7/2010 | An et al. |
| 2010/0229592 | A1 | | 9/2010 | Lim et al. |
| 2010/0275633 | A1 | | 11/2010 | An et al. |
| 2015/0001140 | A1 | * | 1/2015 | Reckin ................... B01D 27/08 210/136 |
| 2017/0304751 | A1 | | 10/2017 | Zhibin |

(Continued)

FOREIGN PATENT DOCUMENTS

| | | |
|---|---|---|
| AU | 2016204166 A1 | 6/2016 |
| AU | 2016204864 A1 | 7/2016 |
| CN | 201630151302 | 4/2016 |

(Continued)

OTHER PUBLICATIONS

U.S. Appl. No. 29/618,349, filed Sep. 20, 2017, Zou Zhibin.

(Continued)

*Primary Examiner* — Dirk R Bass
(74) *Attorney, Agent, or Firm* — Jennifer A. Haynes; Jay White; David Lewis

(57) ABSTRACT

A filter cartridge includes a removable filter. The filter cartridge includes housing that connects to a manifold at one end and has a removable cover at another end. The removable cover is held onto the housing by a removable connector. When one desires to change the filter, the cartridge is disconnected from the manifold, the removable connector is removed, then the removable cover is removed, and then the removable filter is replaced. Next, the removable cover is put back on, then the connector is connected, and the cartridge is reconnected to the manifold.

21 Claims, 20 Drawing Sheets

(56) References Cited

U.S. PATENT DOCUMENTS

2017/0340993 A1 11/2017 Zhibin
2018/0001237 A1 1/2018 Zhibin

FOREIGN PATENT DOCUMENTS

| CN | 201630151303 | 4/2016 |
|----|--------------|--------|
| EP | 3 248 664 A1 | 11/2017 |
| EP | 3 263 201 A1 | 1/2018 |
| WO | WO 03/106003 A1 | 12/2003 |
| WO | WO 2008/066961 A1 | 6/2008 |
| WO | WO 2014/210365 A1 | 12/2014 |
| WO | WO 2018/000254 A1 | 1/2018 |

OTHER PUBLICATIONS

U.S. Appl. No. 29/618,350, filed Sep. 20, 2017, Zou Zhibin.
U.S. Appl. No. 29/618,779, filed Sep. 24, 2017, Zou Zhibin.
U.S. Appl. No. 29/619,251, filed Sep. 27, 2017, Zou Zhibin.

* cited by examiner

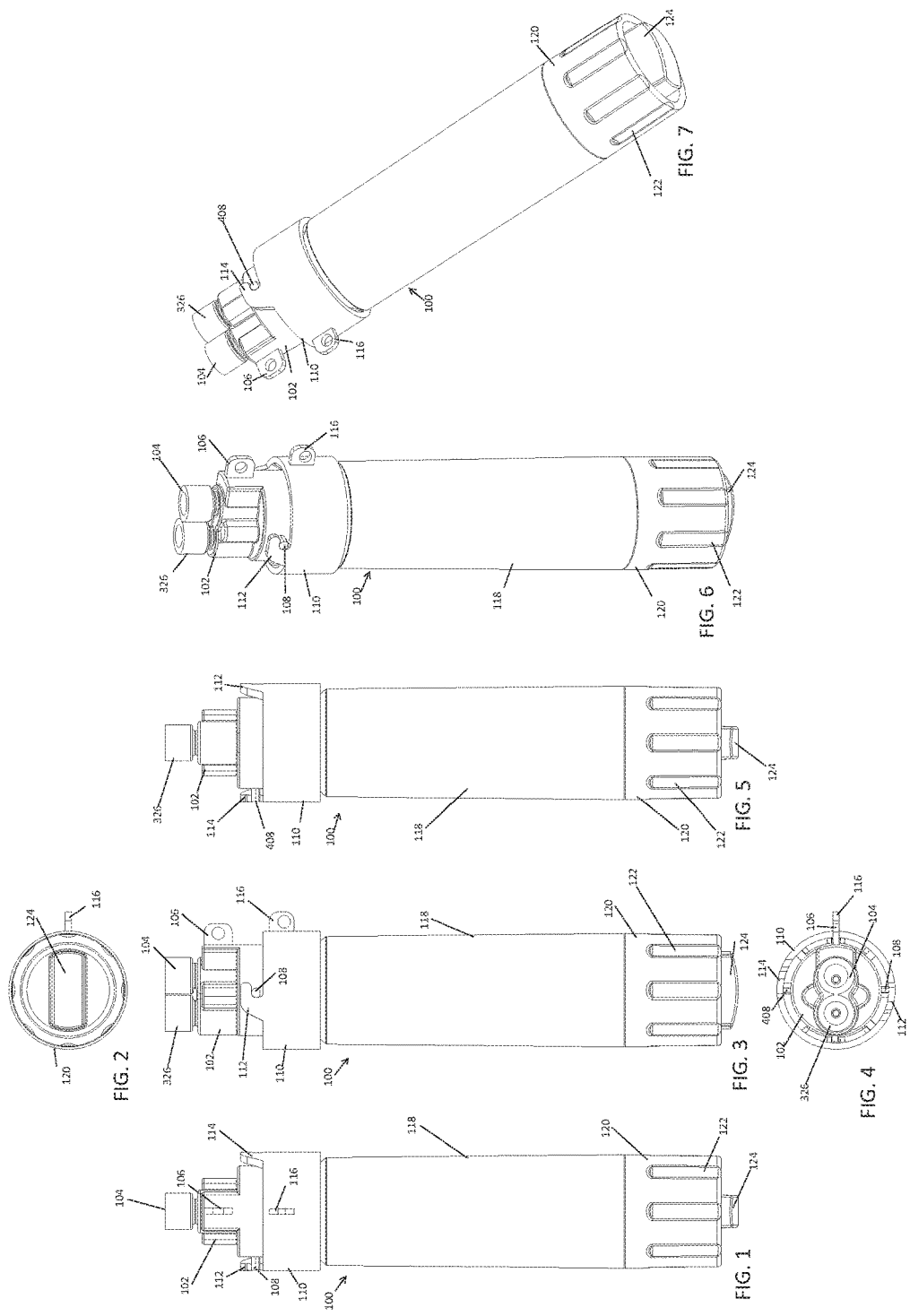

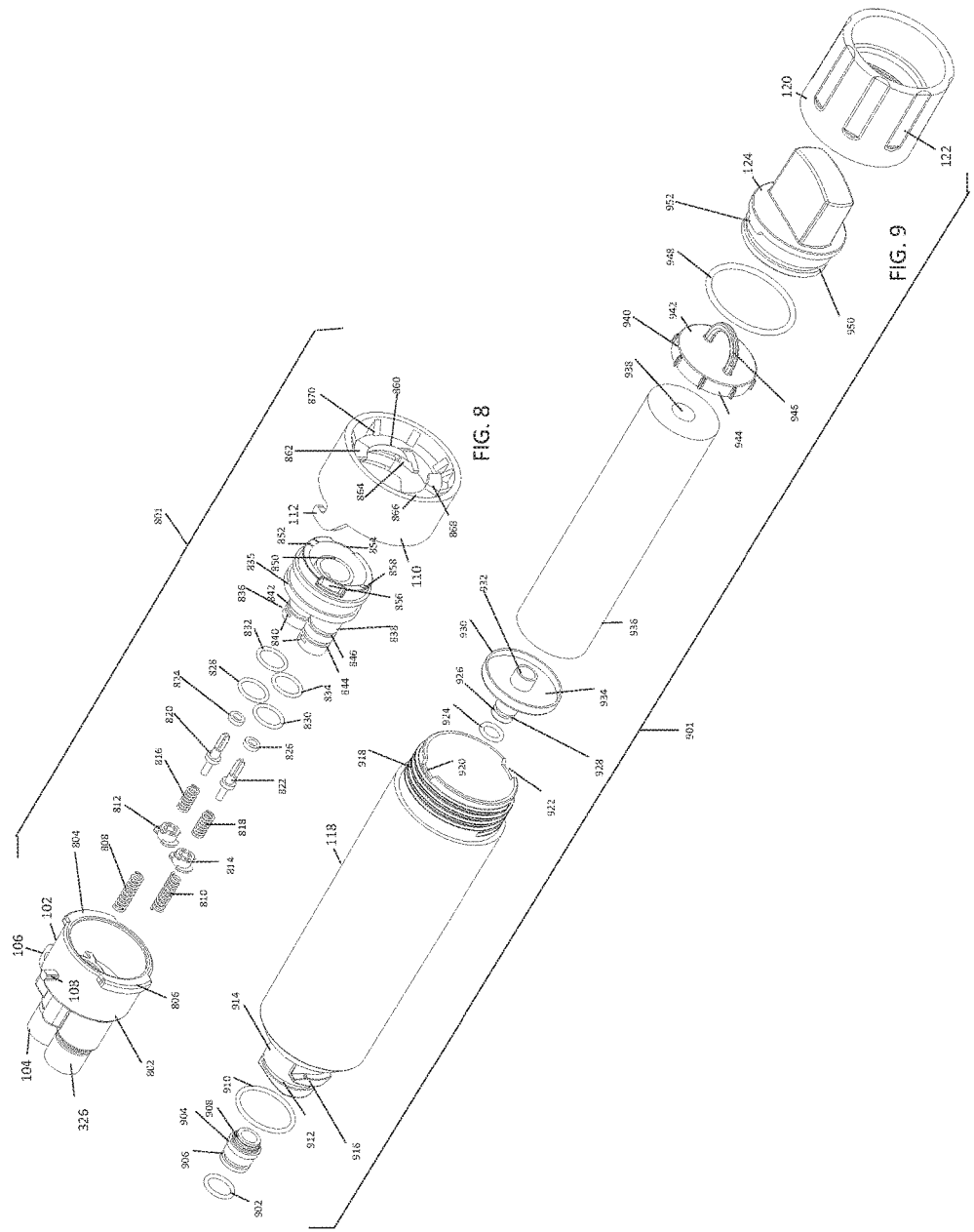

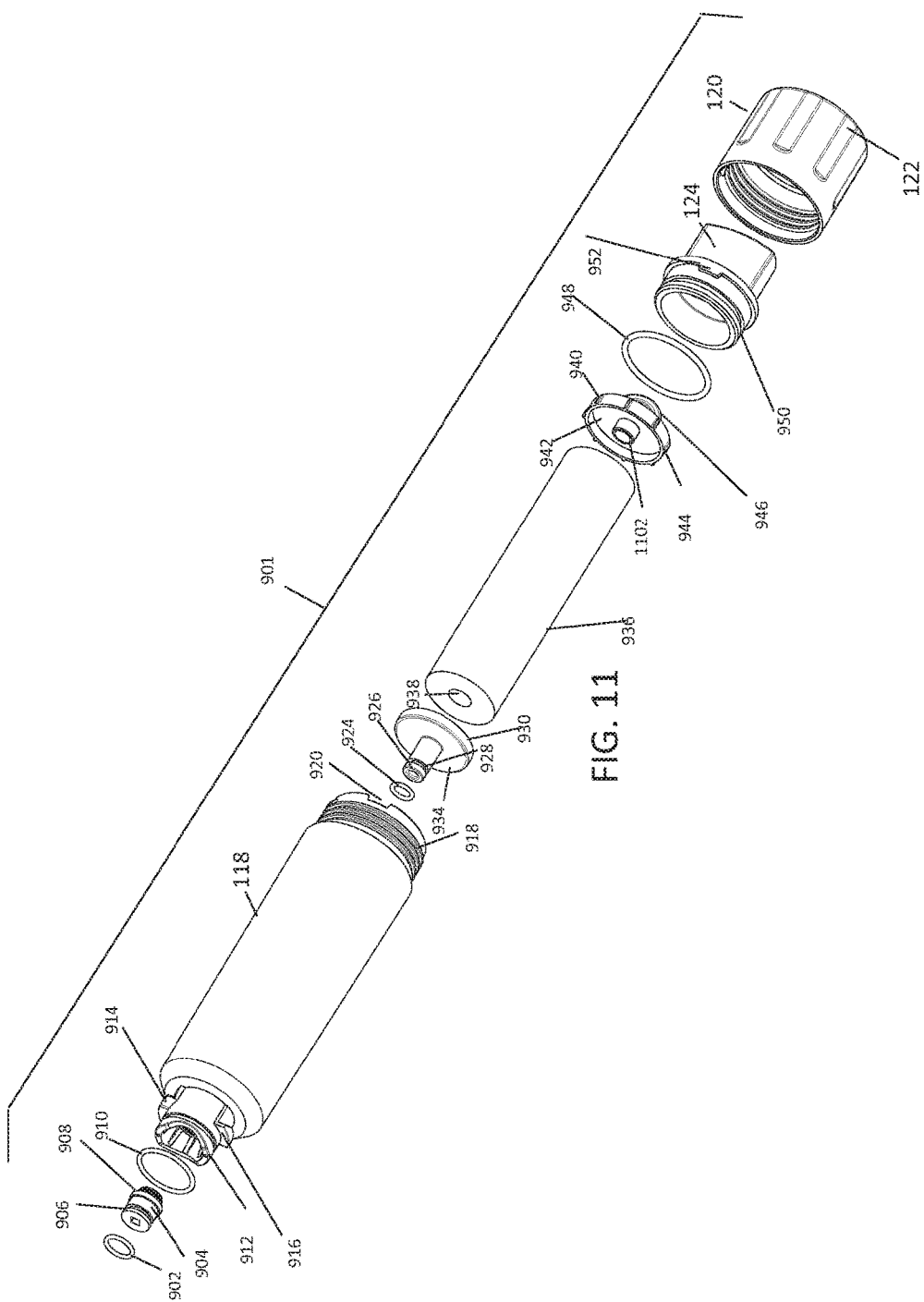

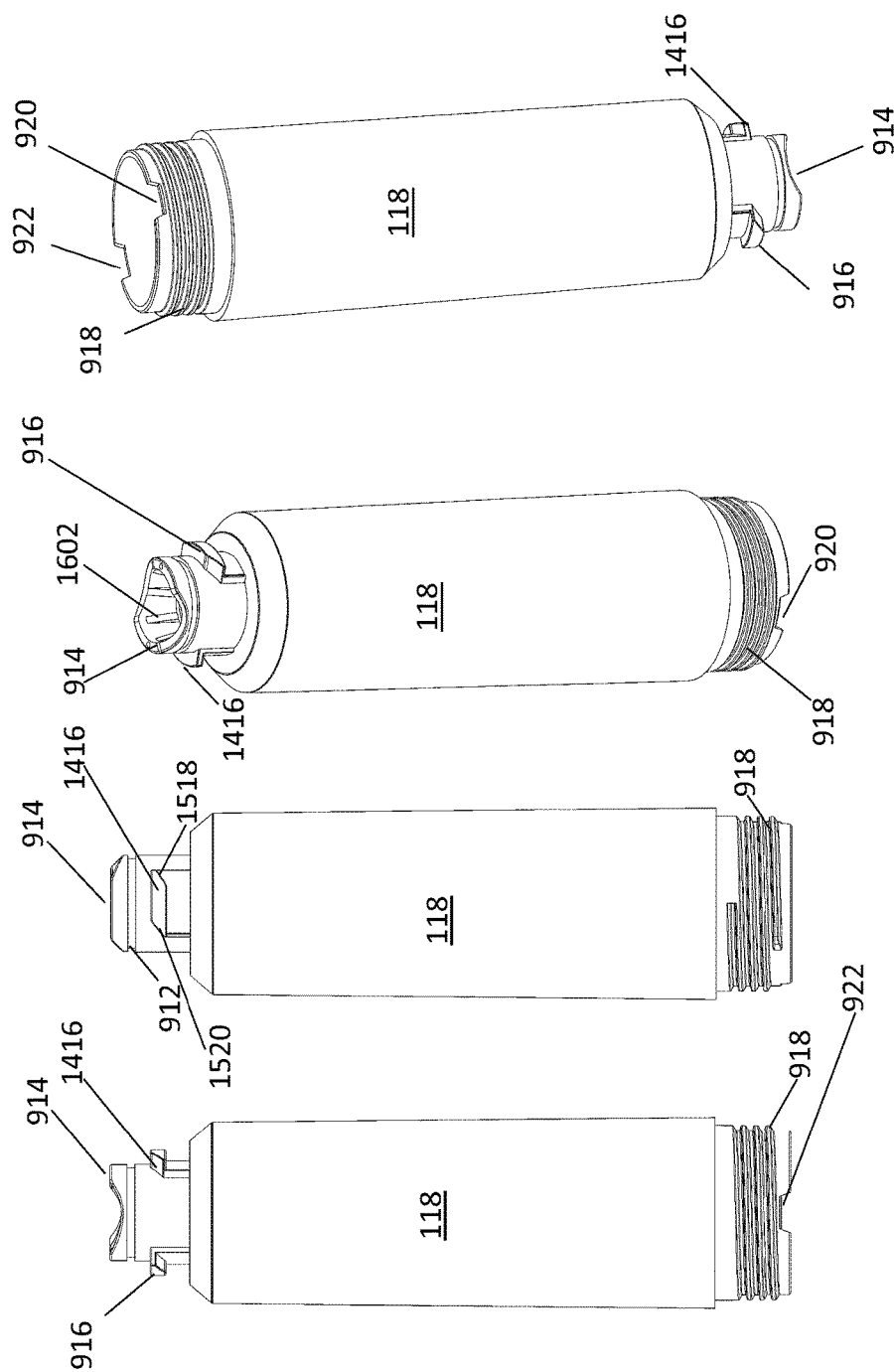

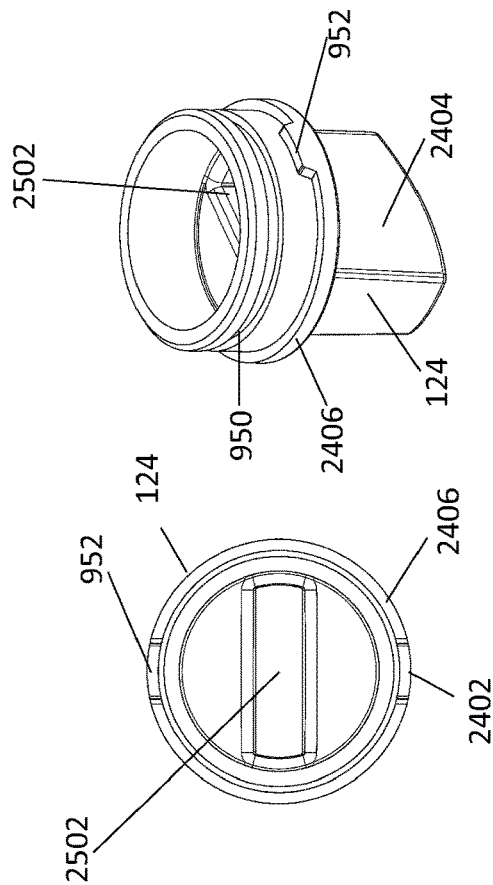
FIG. 26
FIG. 25
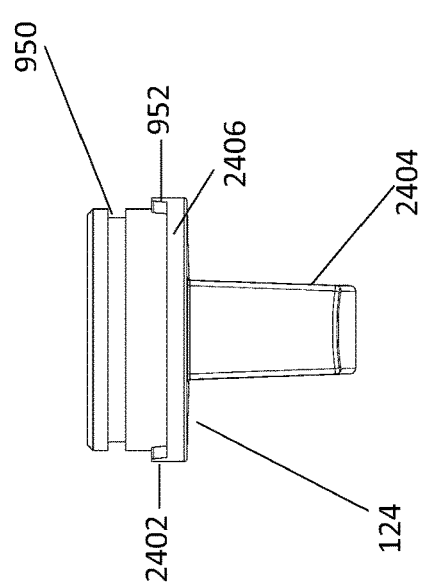
FIG. 24

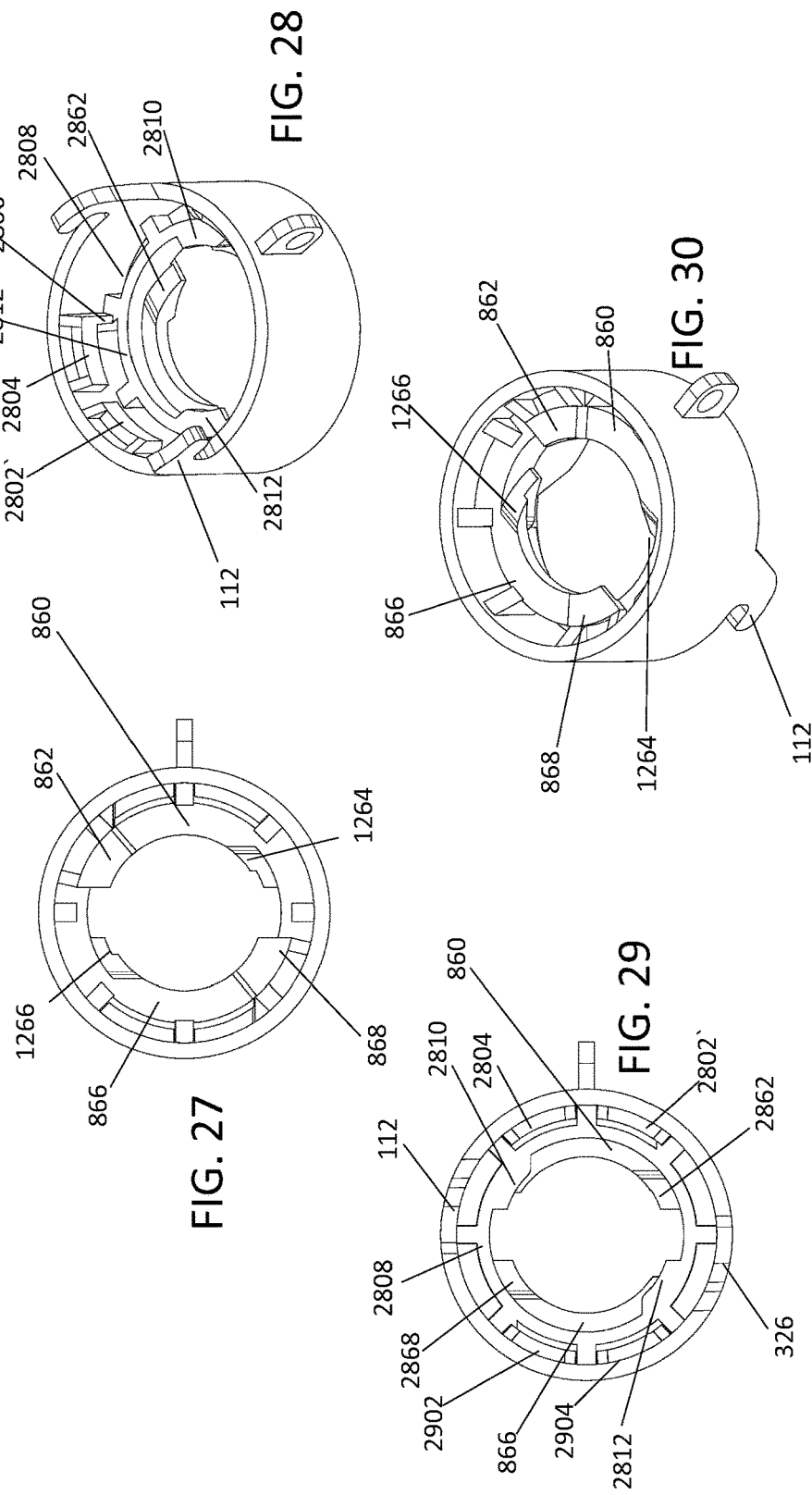

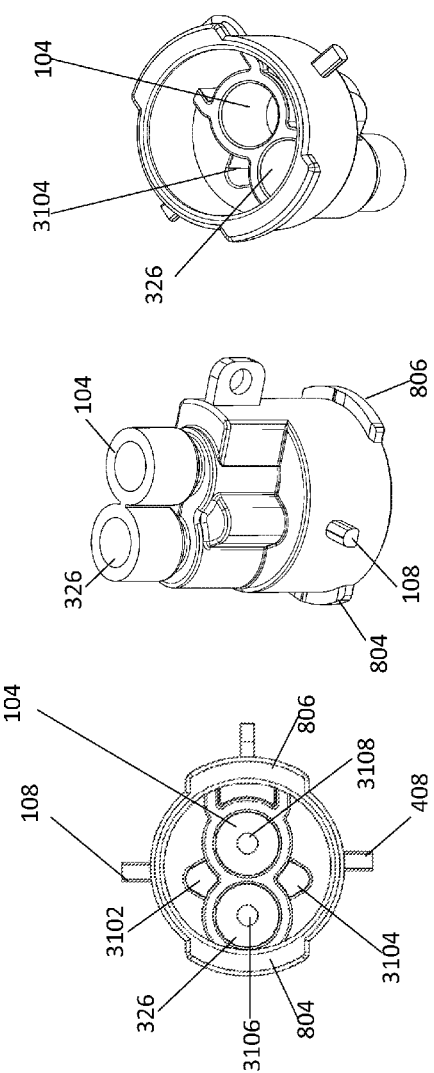

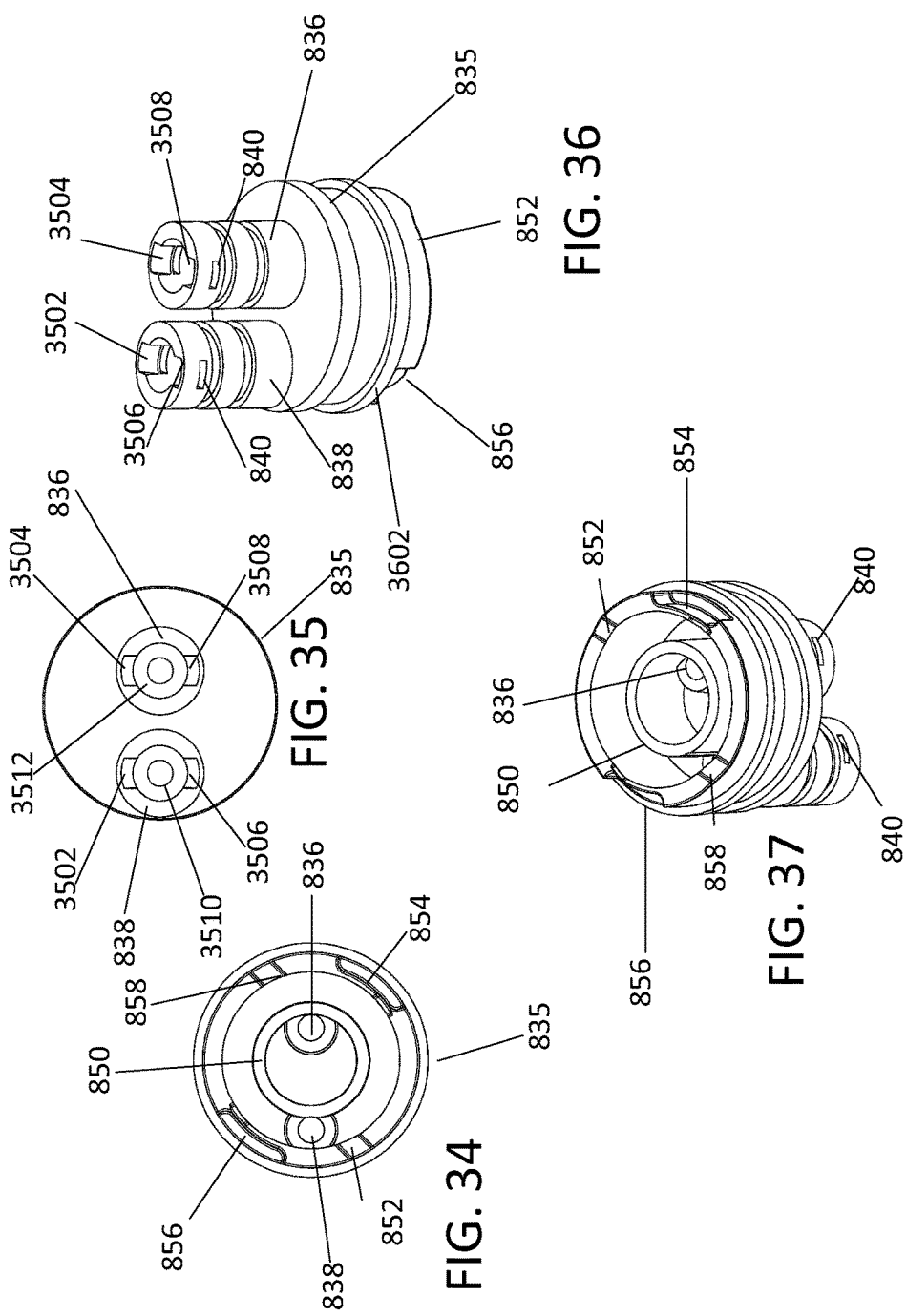

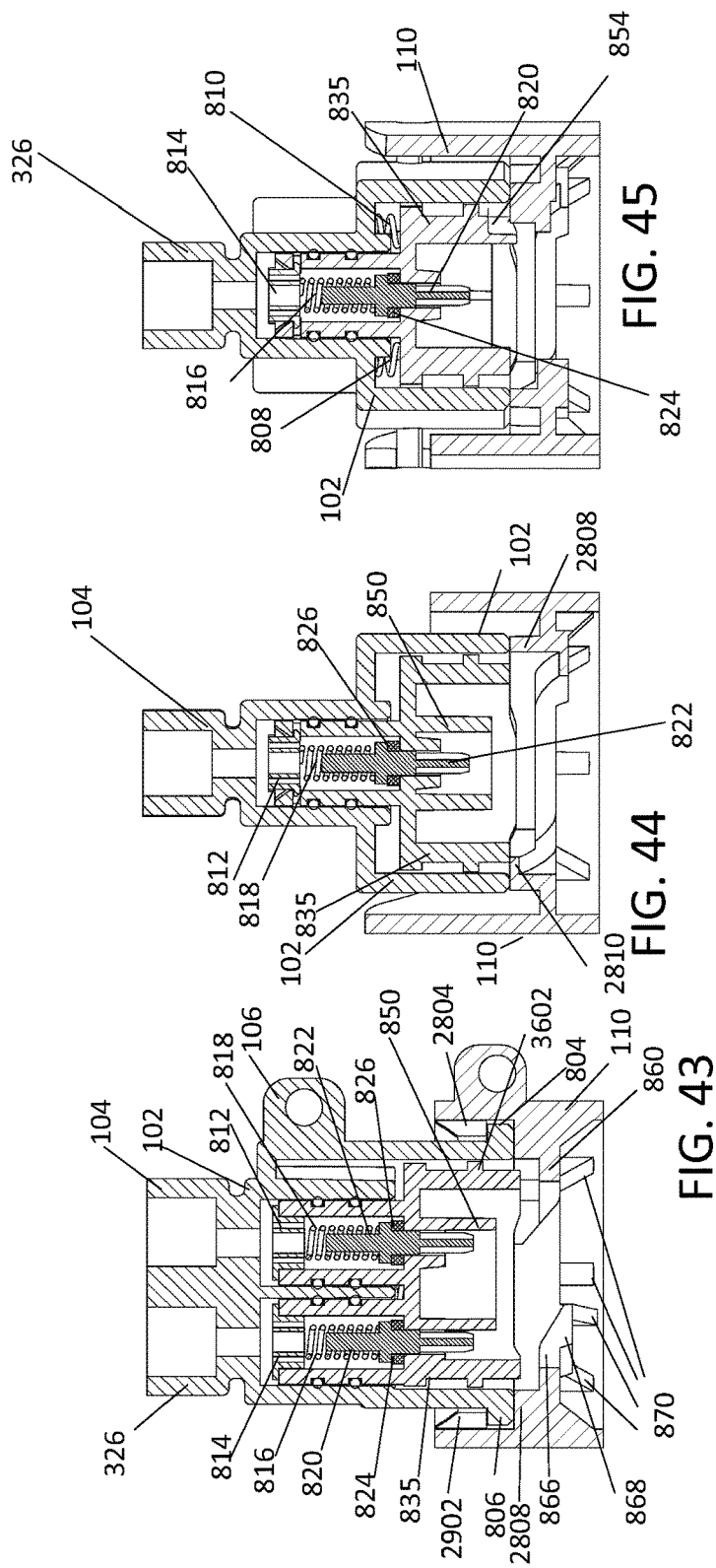

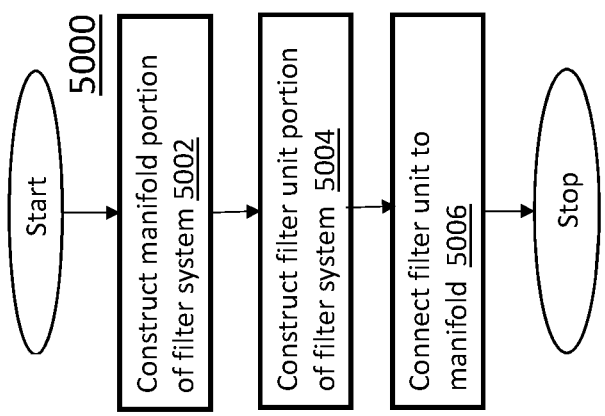

WATER FILTER

FIELD

This specification generally relates to water filters.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Water filters are well known. This specification recognizes that there is a need for a filter system having a removable filter cartridge, which in turn has a removable filter, with an end cap that connects to the filter cartridge so that the filter can be removed.

BRIEF DESCRIPTION OF THE FIGURES

In the following drawings like reference numbers are used to refer to like elements. Although the following figures depict various examples of the invention, the invention is not limited to the examples depicted in the figures.

FIG. 1 shows a front view of an embodiment of the filter system.

FIG. 2 shows a bottom view of an embodiment of the filter system.

FIG. 3 shows a left side view of an embodiment of the filter system.

FIG. 4 shows a top view of an embodiment of the filter system.

FIG. 5 shows a right side view of an embodiment of the filter system.

FIG. 6 shows a left-front perspective view of an embodiment of the filter system.

FIG. 7 shows a right-back perspective view of an embodiment of the filter system.

FIG. 8 is an exploded of an embodiment of the manifold portion of the filter system from a bottom perspective.

FIG. 9 is an exploded view of an embodiment of the filter cartridge portion of the filter system viewed from a bottom perspective.

FIG. 11 is an exploded view of an embodiment of the filter cartridge portion of the filter system viewed from a top perspective.

FIG. 14 shows an embodiment of a first side of the canister.

FIG. 15 shows an embodiment of a second side of the canister, which is oriented 90 degrees with respect to the first side view of FIG. 14.

FIG. 16 shows a top perspective view of an embodiment of the canister.

FIG. 17 shows bottom perspective view of an embodiment of the canister.

FIG. 24 shows a side view of an embodiment of the handle cover.

FIG. 25 shows a top view (a view of the side facing the manifold portion) of an embodiment of the handle cover.

FIG. 26 shows a top perspective view of an embodiment of the handle cover.

FIG. 27 shows a bottom view of an embodiment of the connector.

FIG. 28 shows a top perspective of an embodiment of view of the connector.

FIG. 29 shows a top view of an embodiment of the connector.

FIG. 30 shows a bottom perspective view of an embodiment of the connector.

FIG. 31 shows a bottom view of an embodiment of the manifold housing.

FIG. 32 is top perspective view of an embodiment of the manifold housing.

FIG. 33 is bottom perspective view of an embodiment of the manifold housing.

FIG. 34 shows a bottom view of an embodiment of the fluid distributor.

FIG. 35 shows a top view of an embodiment of the fluid distributor.

FIG. 36 shows an embodiment of a top perspective view of the fluid distributor.

FIG. 37 shows an embodiment of a bottom perspective view of the fluid distributor.

FIG. 43 shows a cross section of the manifold taken along a cut line through the middle of both valve pegs.

FIG. 44 is a cross section of the manifold portion of the filter system taken at a cutline that is perpendicular to the cutline of FIG. 43 and that runs through the middle of the output valve peg.

FIG. 45 is a cross section of the manifold portion of the filter system taken at a cutline that is perpendicular to the cutline of FIG. 43 and that runs through the middle of the input valve peg.

FIG. 50 is a flowchart of a method of making the filter system of FIGS. 1-49.

DETAILED DESCRIPTION

Figure 10:
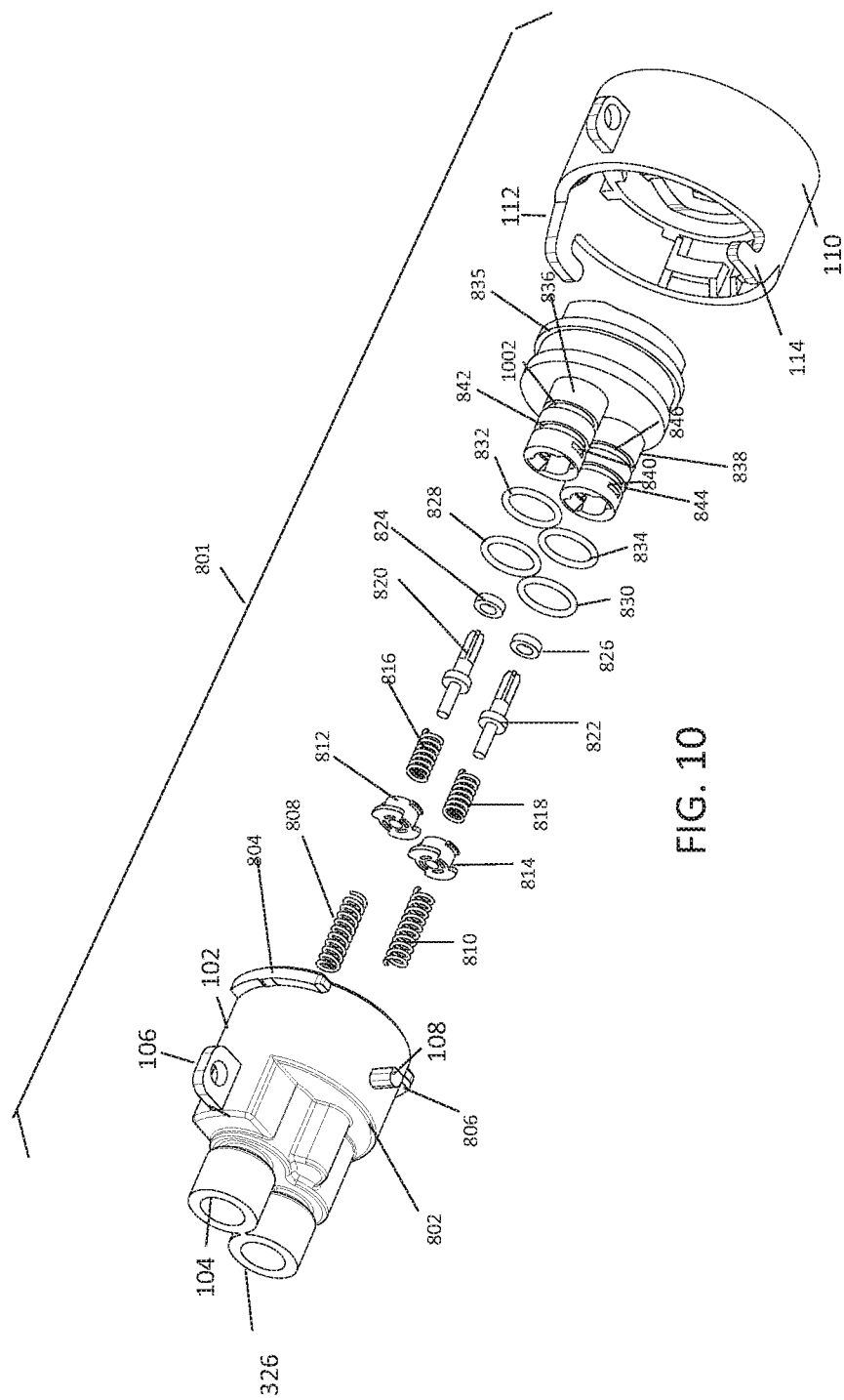
FIG. 10 is an exploded view of an embodiment of the manifold portion of the filter system from a top perspective.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-47 is a brief description of each element, which may have no more than the name of each of the elements in the one of FIGS. 1-47 that is being discussed. After the brief description of each element, each element is further discussed in numerical order. In general, each of FIGS. 1-50 is discussed in numerical order and the elements within FIGS. 1-50 are also usually discussed in numerical order to facilitate easily locating the discussion of a particular element. Nonetheless, there is no one location where all of the information of any element of FIGS. 1-50 is necessarily located. Unique information about any particular element or any other aspect of any of FIGS. 1-50 may be found in, or implied by, any part of the specification.

Filter System FIGS. 1-7

FIGS. 1-7 show different views of a filter system 100, in which the filter system 100 is assembled. FIG. 1 shows a front view of the filter system 100. FIG. 2 shows a bottom view of the filter system 100. FIG. 3 shows a left side view of the filter system 100. FIG. 4 shows a top view of the filter system 100. FIG. 5 shows a right side view of the filter system 100. FIG. 6 shows a left-front view of the filter system 100. FIG. 7 shows a right-back view of the filter system 100.

Filter system 100 (of FIGS. 1-7) includes manifold housing 102, having output port 104 (FIGS. 1 and 3-7), ring 106 (FIGS. 1, 3, 6, and 7), and peg-protrusion 108 (FIGS. 1, 3, 4, and 6). Filter system 100 also includes connector 110 (FIGS. 1, and 3-7) having hook 112 (FIGS. 1 and 3-6), hook 114 (FIGS. 1, 4, 5, and 7), and ring 116 (FIGS. 1, 3, 6, and 7). Filter system 100 includes canister 118 (FIGS. 1, 3, and 5-7) and connector 120 (FIGS. 1-3, and 5-7) having grip 122 (FIGS. 1, 3, and 5-7). Filter system 100 includes handle cover 124 (FIGS. 1-3 and 5-7). Manifold housing 102 also includes input port 326 (FIGS. 3-7) and peg-protrusion 408 (FIGS. 4, 5, and 7). In other embodiments filter system 100 may not have all of the elements or features listed and/or may have other elements or features instead of or in addition to those listed.

In general, in this specification, the words and phrases such as, "top," "bottom," "up," "down," "raising," "lifting," and "lowering" refer to the orientation of the filter system 100 depicted in FIGS. 1 and 3-6. However, filter system 100, may be installed in any orientation, the end of filter system 100 that is at the top of FIGS. 1 and 3-6 may in fact be closer to the ground or at the same distance from than the ground when compared to the end of filter system 100 this at the bottom of FIGS. 1 and 3-6.

Discussing each element of filter system 100 in numerical order, filter system 100 filters a fluid. In an embodiment, filter system 100 filters water for human consumption. Filter system 100 may be used in a refrigerator, such as to filter water prior to being made into ice. Alternatively or additionally, filter system 100 may be used in a refrigerator to filter water prior to drinking (e.g., the refrigerator may provide a source of clear cool drinking water or the filter system 100 may be connected to a faucet or a water supply of a house). In filter system 100, a canister containing a filter may be manually removed, without using tools or damaging the filter system 100, in order to change the filter and/or replace the entire canister that contains the filter. Additionally, the end of the canister has a connector that may be manually removed (without tools and without damaging the filter system 100), so as to remove and replace the filter. After the filter is replaced and/or a new canister is obtained, the canister may be manually installed into the manifold (without tools and without damaging the filter system 100).

Manifold housing 102 (FIGS. 1 and 3-7) one port of the manifold housing 102 connects to a source of a fluid that the user wants to filter, such as a faucet, spigot, or other source, and the other port of the manifold housing 102 connects to a location where the fluid is intended to be used, such as to an ice maker, a water dispenser, or other outlet or location for the filtered fluid, where the filtered fluid is obtained. Output port 104 (FIGS. 1 and 3-7) is a connector to an ice maker, a faucet, spigot, or other outlet or location for the filtered fluid, where the filtered fluid is used. The source of the filter may be a fluid that has already been filtered to some extent or that has not been filtered at all. The source may be a conduit to tap water, water that one desires to recycle, water that is undesirable, undrinkable, or that humans prefer not to drink (or a conduit for supplying another fluid that one desires to filter or further filter prior to use). In this specification, unless indicated otherwise, the term "unfiltered fluid" refers to fluids the user desires to filter and that have not yet been filtered by the filter system.

Ring 106 (FIGS. 1, 3, 6, and 7) is optional and is used for mounting filter system 100. Other forms of mounting filter system 100 may be used instead, such as clips, clamps, bolts, screws, nails pegs, and/or other fasteners. In general, anywhere in this specification any fastener may be substituted with another fastener, such as clips, clamps, bolts, screws, nails pegs, and/or other fasteners, to obtain a different embodiment. In an embodiment ring 106 is a tab with a hole in the tab.

Peg-protrusion 108 (FIGS. 1, 3, 4, and 6) provides structure upon which a hook may hook to latch onto. In other embodiments other forms of fasteners may be used. Fasteners generally have two interlocking components (e.g., a peg and a hook that latches onto the peg) in which one component (e.g., the peg) is on one of two pieces (e.g., the manifold) and the other (e.g., a hook) is on another of two pieces (e.g., a connector). In general, throughout this specification, which component (e.g., the peg or the hook) is on a particular part (e.g., the manifold or the connector) may be switched to obtain a different embodiment. For example, the peg-protrusion 108 may be switched with a hook that hooks to a peg protrusion.

Connector 110 (FIGS. 1, and 3-7) connects manifold housing 102 to the rest of the filter system 100, such as by connecting to a canister that holds one or more filter elements that filter water. Connector 110 connects components that direct fluids from an input port of manifold housing 102 into a portion for receiving unfiltered fluid (or fluid requiring further filtering) of the canister (that is, of the canister that holds the one or more filter elements) and directs filtered fluid out of the canister to a location for use, such as to an ice maker, a faucet, spigot, or other outlet or location for the filtered fluid, where the filtered fluid is used.

Hook 112 (FIGS. 1 and 3-6) hooks connector 110, via hooking to protrusion peg 108, to manifold housing 102, thereby connecting manifold housing 102 to connector 110. In an embodiment, hook 112 is a tab rising from a rim of connector 110 that has a slot parallel to the rim of connector 110 into which protrusion peg 108 slides into. In an embodiment, the side of the tab opposite the slot is sloped, so that the width of the tab narrows as the tab rises above the connector 110 and has a flat edge parallel to the rim of connector 110. In another embodiment, hook 112 may be closer to the center of connector 110 rather than being on the rim or may be on the side of the connector 110 rather than being on top of the rim. Hook 114 (FIGS. 1, 4-5 and 7) is similar to hook 112, but is on the opposite side of connector 110, 180 degrees apart. In other embodiments there may be three hooks, four hooks, five hook, six hooks, seven hooks eight hooks or another number of hooks instead of exactly two (which may be equally spaced from one another or may not be equally spaced from one another).

Ring 116 (FIGS. 1, 3, 6, and 7) is similar to ring 116 and is optional. However, ring 116 is located on connector 110, whereas ring 106 is attached to manifold housing 102. Similar to ring 106, ring 116 may be a tab with a hole in the tab or may be replaced with another fastener. In an embodiment, when ring 106 and 116 are aligned, connector 110 is properly aligned and connected to manifold housing 102.

Canister 118 (FIGS. 1, 3, and 5-7) houses one or more filter elements, which filter fluids, such as water, and may also house other elements related to the filter elements. Canister 118 is a removable filter cartridge. Fluids from an input port of manifold housing 102 may be directed, via components that held within manifold housing 102 by connector 110, into a portion of canister 118 for receiving unfiltered fluids (or fluids requiring further filtering) for filtering. Canister 118 may also be referred to as the housing of the filter. Pressure from the incoming fluids pushes the fluids through the one or more filter elements, filtering the fluids, and then the pressure of the incoming fluid pushes the fluids out of canister 118 into manifold portion of the filter system 100, which directs the fluids into output port 104 of manifold housing 102 to an ice maker, a faucet, spigot, or other outlet or location for the filtered fluid, where the filtered fluid is used, for example.

Connector 120 (FIGS. 1-3 and 5-7) holds a cap onto the bottom of canister 118, maintaining a fluid tight seal, so that fluids do not leak. Connector 120 is detachably removable from canister 118 without damaging canister 118 or the contents of canister 118. In an embodiment, connector 120 may be removed manually, without the use of any tools. In an embodiment, removing connector 120 from canister 118 allows the end cap of the canister 118 to be removed so that the filter may be changed. In an embodiment, connector 120 screws onto canister 118. In other embodiments another type of fastener may be used instead of screw threads. Grip 122 (FIGS. 1, 3, and 5-7) aids in grasping connector 120 and turning and/or removing connector 120, so that the filter may be changed. In an embodiment, grip 122 is formed by a plurality of cylindrical indentations parallel to the length the canister 118. The cylindrical indentations may have indentations of a spherical shape at one or both ends of the indentation. In other embodiments another method of creating a grip may be used, such as by adding bumps.

Handle cover 124 (FIGS. 1-3 and 5-7) covers the end of canister 118 and is held on to canister 118, at least in-part by connector 120. In an embodiment, handle cover 124 covers a handle on an end cap of a filter element within canister 118. Input port 326 (FIGS. 3-7) is located on manifold housing 102. Handle cover 124 is optional and may be one integral piece with connector 102, for example. Input port 326 may be a connector to a source of fluid that the user desires to filter. Input port 326 may be connected to a source of tap water or water that the user desires to recycle, for example. The source of the fluid that input port 326 is connected to may be a fluid that has already been filtered to some extent or that has not been filtered. The source of the fluid may be a conduit to tap water, water that one desires to recycle, water that is undesirable, undrinkable, or that humans prefer not to drink (or a conduit for supplying another fluid that one desires to filter or further filter prior to use). Although in the embodiment of the figures input port 326 and output port 104 are cylindrical conduits concentric about central axes that are parallel to the length of canister 118, in other embodiment, input port 326 and output port 104 may have other cross sectional shapes and/or face in different directions.

Peg-protrusion 408 (FIGS. 4, 5, and 7) is similar to peg protrusion 108, but is on a different side of the filter system 100 (e.g., 180 degrees apart from peg-protrusion 108). Peg-protrusion 408 may be referred to as a lug. In an embodiment, there is one peg-protrusion for each hook 112 and 114. In an embodiment hooks 112 and 114 and peg-protrusions 108 and 408 are arranged so that when hooks 112 and 114 engage peg-protrusions 108 and 408, the output port 104 and input port 326 are aligned with corresponding conduits in connector 110 and/or canister 118.

Exploded Views of Filter System (FIGS. 8-11)

FIGS. 8-11 are exploded views of filter system 100. FIGS. 8 and 9 are two parts of the same exploded view of filter system 100, and FIGS. 10 and 11 are two parts of a different exploded view of filter system 100. FIGS. 8 and 9 show an exploded view of the system 100 from a bottom perspective, where the word bottom is being used to refer to the side furthest from the manifold, FIGS. 10 and 11 show an exploded view from a top perspective of filter system 100 (the top is being used to refer to the manifold end of the filter system 100).

First Exploded View of the Manifold Portion of the Filter System (FIG. 8)

FIG. 8 shows an exploded view of the manifold portion 801 of filter system 100. Manifold portion 101 of FIG. 8 includes manifold housing 102, output port 104, ring 106, peg-protrusion 108, connector 110, hook 112, and input port 326. Manifold housing 102 also includes base 802, and flanges 804 and 806. Manifold portion 801 also includes springs 808 and 810, valve supports 812 and 814, valve springs 816 and 818, valve pegs 820 and 822, peg rings 824 and 826, o-rings 828, 830, 832, and 834, fluid distributor 835 having output conduit 836 and input conduit 838. Output conduit 836 and input conduit 838 includes slots 840. Output conduit 836 also includes o-ring groove 842, and input conduit 838 includes o-ring grooves 844 and 846. Fluid distributor 834 also includes conduit divider 850, and notch sloped portion 852, notch 854, notch 856, and sloped portion 858. Connector 110 includes flange 860 having raised portions 862 and 864. Connector 110 also includes flange 866 having raised portion 868, and connector 110 includes struts 870. In other embodiments, the manifold portion 801 of the filter system 100 may include additional components and/or may not include all of the components listed above.

Manifold housing 102, output port 104, ring 106, peg-protrusion 108, connector 110, hook 112, and input port 326 were discussed, above, in conjunction with FIGS. 1-7. However, FIG. 8 shows further details of how manifold housing 102 is connected, via connector 110, to canister 118 in FIG. 9, and FIG. 8 shows structures that guide the fluid flow.

Base 802 is the base of manifold housing 102. Base 802 is at one end of output port 104 and input port 326. Base 802 forms a cavity that houses and in-part supports a valve mechanism, which allows fluids to flow when canister 118 is connected to manifold housing 102 and prevents fluids from flowing when canister 118 is removed, such as in order to replace canister 118 or in order to change the filter. Flanges 804 and 806 engage a corresponding set of flanges within connector 110 to hold manifold housing 102 to connector 110, and may thereby hold the contents of the manifold portion 801 in place.

Springs 808 and 810 are seated within base 802 and push against a fluid distributor so that when canister 118 is connected to the manifold, the fluid distributor makes a firm contact with the neck portion of the canister 118. As a result of springs 808 and 810, the fluid distributor rests on a flange in the connector when the removable filter portion is removed from manifold portion 801. Springs 808 and 810 are optional. In this specification, any place a coil spring is disclosed, another spring or another mechanical bias may be substituted to obtain a different embodiment. Valve supports 812 and 814 supports springs that push pegs into holes in a fluid distributor to create the valves.

Valve supports 812 and 814 each have two large flanges at one end that keep valve supports 812 and 814 from falling into and/or rigidly aligned with the input and output conduits of the fluid distributor and two smaller flanges that engage slots within the input and output ports of the fluid distributor. In an alternative embodiment, valve supports could be formed as one integral piece with the input and output conduits of the fluid distributor and the rest of the valve assembly could be inserted into the input and output conduits of fluid distributor from the opposite end of the input and output conduits with respect to where valve supports 812 and 814 are located.

Valve springs 816 and 818 push against valve supports 812 and 814, respectively, thereby pushing pegs into holes in the input and output ports of the fluid distributor to prevent fluid flow when canister 118 is disconnected. In an alternative embodiment valve springs 816 and 818 may be mounted on flanges extending inwardly from the walls of the input and output conduits of filter distributor 835, and valve supports 812 and 814 may be left out.

In an embodiment valve springs 816 and 818 are stronger than the mechanical bias (e.g., created by springs 808 and 810, such as by valve springs 816 and 818 being stronger than spring 808 and 810), so that the valves of filter system 100 (e.g., the valves formed by valve pegs 820 and 822) open after the mechanical bias of filter system is overcome (e.g., after springs 808 and 810 are compressed) and close before the mechanical bias of the filter system 100 is relaxed (e.g., after springs 808 and 810 are decompressed), so that there is no fluid flow unless the canister 118 is attached or at least so that the amount of fluid flow while canister 118 is in the process of being attached or in the process of being detached is less than were springs 808 and 810 not present or stronger than valve springs 816 and 818.

Valve pegs 820 and 822 are pegs that reside and/or mounted within valve springs 816 and 818, respectively. Valve pegs 820 and 822 are pushed by valve springs 816 and 818, respectively, into holes in the input and output ports of the fluid distributor to prevent fluid flow when canister 118 is disconnected.

Peg rings 824 and 826 are optional and reside within the input and output ports of the fluid distributor at the end of valve pegs 820 and 822, so that when valve springs 816 and 818 push valve pegs 820 and 822 into holes in the input and output ports of the fluid distributor, valve pegs 820 and 822 push peg rings 824 and 826 against the rim of the holes upon which peg rings reside, to form a seal preventing fluids from flowing. Alternatively, the seal could be formed by the collar on valve pegs 820 and 822 without the aid of valve pegs 824 and 826.

O-rings 828, 830, 832, and 834 are placed on an outer surface of input conduit 836 and output conduit 838 of the fluid distributor, so that a seal is formed between the outer surface of the input conduit 836 and output conduit 838 of the fluid distributor and the inner surface of input conduit 326 and output conduit 104 within base 802 of manifold housing 102, preventing fluid leaks. In alternative embodiments, the seals may be formed by other means, such as by the walls of the input and output conduits.

Fluid distributor 835 distributes fluids (e.g., unfiltered fluids) coming from input conduit 326 to one side of one or more filter elements within canister 118 and receives filtered fluids exiting canister 118, when canister 118 is connected. The rim of fluid distributor 835 is contoured to complement and engage structures within connector 110 and portions of the rim of the neck of canister 118 to ensure that canister 118 and fluid distributor 835 are properly aligned so that incoming fluids enter on one side of the one or more filter elements (e.g., exterior to a hollow cylinder) and exit on another side of the one or more filter elements (e.g., from a cavity at the core of the cylinder).

Output conduit 836 connects fluid distributor 835 to output conduit 104, so that fluids leaving canister 118 exit through output conduit 836, past the valve formed by valve support 812, valve spring 814, valve peg 816 and peg ring 820, into output conduit 104.

Similarly, input conduit 838 connects fluid distributor 835 to input conduit 326, so that incoming fluids that need to be filtered flow from input conduit 326 through valve support 814, into input conduit 838, past valve spring 818, valve peg 822, and peg ring 826, into canister 118.

In an embodiment, input conduit 838 and output conduit 836 are formed as one integral piece of material with the rest of fluid distributor 835. In an alternative embodiment, input conduit 838 and output conduit 836 detach from the rest of fluid distributor 835 and or may each be constructed form two or more detachable pieces (e.g., allowing valve springs 816 and 818 and valve pegs 820 and 822 to be inserted from a section of input conduit 838 and output conduit 836 where vale supports 812 and 814 are not located).

Slots 840 in output conduit 836 and input conduit 838 engage the smaller tabs on valve supports 812 and 814. However, slots 840 are optional and valve supports 812 and 814 may be connected to output conduit 836 and input conduit 838 in another way or may be an integral part of output conduit 836 and input conduit 838. O-ring groove 842 (of output conduit 838) holds o-ring 828 in place. Output conduit 838 has a second o-ring groove for holding o-ring 832, which is hidden from view in FIG. 8. O-ring grooves 844 and 846 (of input conduit 836) hold o-rings 830 and 834, respectively (o-ring grooves 844 and 846 are not needed in embodiments in which the fluid tight seal is created in another manner).

Conduit divider 850 divides between an input conduit and an output conduit. In an embodiment, conduit divider 850 is a cylindrical structure having a circular cross section that extends from an interior surface of fluid distributor 835. The region interior to the conduit divider opens to the output conduit 836 of fluid distributor 835. The region exterior to the conduit divider 850 opens to input conduit 838.

Notch 854 is a notch on a rim of fluid distributor 835 that is on an opposite end of fluid distributor 835 from output conduit 836 and input conduit 838. When fluid distributor 835 rests within connector 110, notch 854 rests over a protrusion from a wall of fluid distributor 835 that helps align fluid distributor 835 when canister 118 is disconnected from the manifold portion of the filter system 100. Sloped portions 852 and 858 are portions of the rim of fluid distributor 835. The rim of fluid distributor 835 has multiple elevations (e.g., to match a complementary contour of part of the rim of the neck of canister 118), and sloped portions 854 and 856 are the regions of the rim of fluid distributor 835 that transition from one elevation to another. The contour of the rim of fluid distributor 835 match a contour formed by flange with connector 110 and breaks between flanges of connector 110. Similar to notch 854, notch 856 is a notch on a rim of fluid distributor 835 that is on an opposite end of fluid distributor 835 from output conduit 836 and input conduit 838. When fluid distributor 835 rests within connector 110, notch 856 rests over a protrusion from flanges on a wall of fluid distributor 835 that helps keep fluid distributor 835 aligned. In an embodiment, notches 854 and 856 are 180 degrees from one another. In other embodiments instead there being two notches, there may be one notch, two notches, three notches, four notches, five notches, six notches, seven notches, eight notches or another number of notches in the rim of fluid distributor 835. Notches 854 and 856 engage protruding portions on flanges in connector 110 so that fluid distributor 835 maintains a fixed orientation with respect to connector 110, which thereby keeps output conduit 836 and input conduit 838 aligned with output conduit 104 and input conduit 326, so that the fluid flows from the fluid source through canister 118 and out to the output for the intended use of the fluid. In alternative embodiments, the alignment of fluid distributor with connector 110 may be maintained using different structures.

Flange 860 engages a corresponding flange on the neck of the canister 118. Raised portions 862 point away from manifold housing 102 and may prevent canister 118 from being rotated in the wrong direction (by acting as a stop), after canister 118 is inserted into connector 110, and when removing the canister 118, raised portion may prevent canister 118 from being rotated more than necessary to remove canister 118 from connector 110 (in the perspective of the viewer of FIG. 8, the canister 118 is rotated clockwise after being inserted and is rotated counter clockwise to remove canister 118 from connector 110). The side of raised portion 862 that faces towards canister manifold housing 102 is sloped so that it is easier to turn the canister 118 clockwise, after being inserted into connector 110, so that the canister 118 engages connector 110, and is held in place. Raised portion 864 faces towards manifold housing 102 and may prevent canister 118 from being rotated too far in the clockwise direction upon insertion into connector 110. The side of raised portion 864 that faces away from manifold housing 102 is sloped, so that it is easier to rotate canister 118 in the counter clockwise direction when it is desired to remove canister 118 from connector 110. Flange 866 is similar to flange 860 and raised portion 868 is similar to raised portion 862, which were described above. Struts 870 support flanges 860 and 866. In other embodiments, although the performance may not be as good, another mechanism of attaching the filter portion of the filter system to, and aligning the filter portion of the filter system with, connector 110 may be used, such as screw threads, latches, and/or clamps.

The contour of the rim of fluid distributor 835 is chosen, so that the rim of fluid distributor 835 rests on (or at least does not interfere with) surfaces of raised portion 864 of flange 860, the corresponding raised portion on flange 866 and other portion of the surface of flanges 860 and 866 that face manifold housing 102, when fluid distributor 835 is properly aligned with connector 110.

In other words, prior to canister 835 being inserted into connector 110, fluid distributor 835 rests on flanges within connector 110. When canister 118 is first inserted into connector 110, canister 118 is rotated clockwise. While being rotated clockwise, flanges on the neck of canister 118 are caught by the sloped portion on the side of flanges 860 and 866 that face manifold housing 102, which is the other side of raised portion 862 and 868, respectively. Canister 118 is rotated until stopped by raised portion 864 (which is on flange 860), and/or is stopped by another raised portion on flange 866 that faces manifold housing 102 and is not visible in FIG. 8, at which point the canister is properly aligned with manifold housing 102 and fluid distributor 835. As canister 118 is rotated clockwise, portions of the neck of canister 118 push upon valve pegs 820 and 822, opening the valves with the manifold portion of filter system 100. As canister 118 is rotated clockwise, portions of the neck of canister 118 push against the mechanical bias within filter system 100 (e.g., formed by spring 808 and 810) lifting fluid distributor 835 off the protrusions from the flanges within connector 110. When attempting to insert canister 118, if the canister 118 is rotated counter clockwise, the counter clockwise rotation is stopped by raised portions 862 and 864. Once, canister 118 is properly aligned fluid distributor 835 is raised off the flanges within connector 110, and the manifold portion of the filter system 100 rests on the heads of valve pegs 820 and 822, with valve peg 822 resting on a raised portion of the rim of the neck of canister 118, and valve peg 820 resting on a rim of an output conduit within the neck of canister 118.

When it is desired to remove canister 118 from connector 110, canister 118 is rotated counter clockwise, and flanges on the neck of canister 118 are caught by the sloped surface on flanges 860 and 866 that face away from manifold housing 102, which are located on the other side of raised portion 864 (on flange 860) and on the other side of another raised portion, which is on flange 866, which is not visible in FIG. 8. As canister 118 is rotated counter clockwise, the portions of the neck of canister 118 that support valve pegs 820 and 822, move away from the manifold portion of filter system 100, releasing valve pegs 820 and 822, thereby closing the input and output valves (and input conduit 836 and output conduit 838) within fluid distributor 835. As canister 118 is rotated counter clockwise, the mechanical bias within filter system 100 (e.g., formed by springs 808 and 810) lowers fluid distributor 835 towards the protrusions from the flanges within connector 110. The counter clockwise rotation of canister 118 may be stopped by raised portions 862 and 868, at which time, canister 118 may be pulled away from connector 110. Once canister 118 has been rotated counter clockwise, so that canister 118 may be removed from connector 110, as a result of the mechanical bias within filter system 100 (e.g., formed by spring 808 and 810) the fluid distributor 835 again rest on the flanges within connector 110, and valve pegs 820 and 822 and valve pegs 820 and 822 rest on and close holes within fluid distributor 835 (e.g., by resting on peg rings 824 and 826), closing the input and output valves of filter system 100.

Although in the embodiment of FIG. 8, there are two flanges (860 and 866), in other embodiments there may be a different number of flanges. For example, there may be one flange, three flanges, four flanges, five flanges, six flanges, seven flanges, eight flanges, or another number of flanges. In another embodiment, flanges 860 and 866 may be replaced with a screw thread or another fastener. As mentioned above, in other embodiments, although the performance may not be as good, another mechanism of attaching the filter portion of the filter system to, and aligning the filter portion of the filter system with, connector 110 may be used, such as screw threads, latches, and/or clamps.

First Exploded View of the Removable Filter Portion of the Filter System (FIG. 9)

FIG. 9 shows the removable filter portion 901 of filter system 100. Removable filter portion 901 includes canister 118, connector 120, grip 122, and handle cover 124, which were discussed in conjunction with FIGS. 1-7. Removable filter portion 901 also includes neck-extension o-ring 902, neck extension 904 having groove 906 and screw threads 908, and o-ring 910. Canister 118 includes neck groove 912, neck 914, flange 916, screw threads 918, and notches 920 and 922. FIG. 9 also shows o-ring 924, top filter cover 926 having groove 928, rim 930, extension 932, and plate 934. Removable filter portion 901 also includes filter 936 having filter cavity 938. FIG. 9 includes bottom cap 940 having plate 942, rim 944, protrusions 945, and handle 946. Removable filter portion 901 also includes o-ring 948. Handle cover 124 includes groove 950 and protrusion 952. In other embodiments, the removable filter portion 901 of filter system 100 may include additional components and/or may not include all of the components listed above.

The removable filter portion 901 may also be referred to as the canister portion. Neck-extension o-ring 902 is an o-ring for an extension that attaches to the neck of canister 118. Neck extension 904 is an extension that attaches to the neck of the canister 118. Neck extension 904 is a cylindrical extension that screws into a socket within the neck of canister 118 and includes a hole (e.g., and noncircular hole) through the (e.g., through the center of the) neck extension 904 through which output fluid leaves canister 118 into the interior of conduit divider 850 into output conduit 838. When canister 118 is connected to connector 110, neck extension 904 is inserted into conduit divider 850 and fits snuggly within conduit divider 850, such that the combination of conduit divider 850, o-ring 902 and neck extension 904 form a fluid-tight seal, keeping filtered fluids from mixing with unfiltered fluids.

Neck extension 904 has a diameter that is less than the inner diameter of the neck of the canister 118, and the socket within the neck of canister 118 has an outer diameter that is less than the inner diameter of the neck of the canister 118, so that incoming unfiltered fluids enter canister 118 in the space between the outer edge of the socket into which extension 904 is attached and the inner edge of the neck of the canister 118, whereas filtered water leaves canister 118 through the hole within (e.g., in the center of) neck extension 118. When canister 118 is connected to connector 110, a rim of neck extension 904 presses against valve-peg 820, which keeps the output valve (and output conduit 836) of manifold portion of filter system 100 open. In at least some embodiments, the distance between the inner wall of the neck of canister 118 and the outer wall of extension 904 or a structure supporting neck extension 904 is relatively small (e.g., compared to the average width of the fingers of an average person) making it difficult to place -o-ring 902 on neck extension 904, when neck extension 904 is attached to canister 118. By making neck extension 904 detachable, o-ring 902 may be more easily placed on neck extension 902 during the initial assembly of filter system 100 or to replace o-ring 902 when o-ring 902 wears out.

Groove 906 holds o-ring 902, thereby aiding in creating the seal between conduit divider 850 and neck extension 904 (groove 906 is not necessary in embodiments in which o-ring 902 is not used). In other embodiments, neck extension 904 may be attached to the structure within the neck of canister 119 in other ways, such as with latches, clasps or my snapping neck extension 904 in place.

Screw threads 908 attach neck extension 904 to the socket with the neck of canister 118. By making the hole in neck extension noncircular, a tool that has a shape that compliments and/or engages the hole in neck extension 904 may be used for turning neck extension to screw neck extension in place, via threads 908. O-ring 910 fits on the neck of canister 118 to create a seal between the neck of canister 118 and the interior walls of fluid distributor 835 (FIG. 8). Neck groove 912 is the groove on the neck of canister 118 onto which o-ring 910 is placed (neck groove 912 is not necessary in embodiments in which o-ring 910 is not present).

Neck 914 is the neck of the canister 118. Fluids entering and leaving canister 118 enter and leave via neck 914. Neck 914 has a rim that faces an interior region of fluid distributor 835, which is between the outer walls of conduit divider 850 and the inner wall of fluid distributor 835. The portion of the rim of the neck 914 that faces fluid distributor 835 is contoured, so that when canister 118 is inserted into connector 110, the raised portion of the rim of neck 914 faces valve peg 814, pushing valve peg 814 towards manifold housing 102, opening the valve within input conduit 838 allowing unfiltered fluids to enter canister 118, via the region between the outer wall of the socket that holds extension 904 and the inner walls of neck 914. Fluids exiting canister 118, exit canister 118 via neck 914 by exiting through neck extension 904, which is located within neck 916.

Flange 916 interlocks with flange 860 or 866 (FIG. 8) to hold neck 914 to connector 110 and fluid distributor 835. Flange 916 may be referred to as a lug. Flange 916 may help support the filter portion 901 when filter portion 901 is connected to manifold portion 801. Flange 916 is sloped on both ends. In an embodiment, flange 916 has a cross section that is parallel to the circumference of the neck 914 that has a shape that forms a rhombus (were the cross section flattened).

Screw threads 918 are at the end of the canister 118 that is furthest from manifold housing 102. Screw threads 918 may attach canister 118 to connector 120 (in other embodiments another method of attaching canister 118 may be used). Notches 920 and 922 engage protrusions on handle holder 124, so that canister 118 and handle holder 124 are maintained in a fixed alignment.

O-ring 924 fits on top of a filter cover so that filtered water leaving the filter does not leak. Top filter cover 926 prevents unfiltered fluids entering canister 118 from leaving canister 118 without passing through the filter. Top filter cover 926 is located on the end of the filter that is closest to the manifold housing 102. Groove 928 holds o-ring 924.

Groove 928 is located on a neck of top filter cover 926 (in an embodiment, the neck of top filter cover 926 forms a conduit for fluids exiting the filter). The neck of top filter cover 926 fits into the interior of the filter divider 850 (FIG. 8), and with the aid of o-ring 924 forms a fluid tight (e.g., watertight) seal (groove 926 is not necessary in embodiments in which the seal is formed without o-ring 924).

Rim 930 fits around a portion of the exterior wall of the filter. Extension 932 may aid in keeping the filter from moving sideways. Extension 932 extends below filter cover 926 into a cavity of the filter. Filtered water leaves the cavity of the filter through extension 932. In an embodiment, extension 932 has a circular cross section and is shaped like a tube. Plate 934 is flat and rest upon the filter to keep unfiltered water from entering a cavity within the filter.

Filter 936 filters the fluid. In an embodiment, incoming unfiltered fluids or fluids in need of filtering are distributed outside an exterior of filter 936 seeps through the walls of the filter into an interior cavity, and then leaves canister 118, via extension 932, and top filter cap 926. In an embodiment, top filter cover 926 fits snuggly on top of filter 936, so that unfiltered water does not bypass the filter and does not enter top filter cap 926.

Filter cavity 938 is a cavity within filter 936. Unfiltered water seeps through filter 936 into filter cavity 938.

Bottom cap 940 fits on the end of filter 936 that is further from manifold housing 102. Bottom cap 940 also keeps unfiltered fluid from bypassing filter 936. Plate 942 is a flat portion of bottom cap 940 that covers an entrance to filter cavity 938 at the end of filter 936 that is furthest from manifold housing 102. Rim 944 fits around a portion of an exterior of filter 936, which helps hold filter 936 and may help keep unfiltered water from entering filter cavity 936. Handle 946 may be used grab bottom cap 940 to remove bottom cap 940 and replace filter 936. Protrusions 945 are optional, and may help keep bottom cap 940 and therefore filter 936 aligned within canister 118.

O-ring 948 helps create a seal between handle cover 124 and interior walls of canister 118. Groove 950 holds o-ring 948 on handle cover 124 (groove 950 is not necessary if another mechanism that does not rely on o-ring 948 is used to create a fluid-tight seal). Protrusion 952 fits into notches 920 and 922 to keep handle cover 124 aligned with canister 118, so that rotating cover handle 124 rotates canister 118 and thereby rotates neck 914 with respect to connector 110 and cause flanges 916 to interlock with flanges 860 and 866 or to disengage from flanges 860 and 866.

Second Exploded View of the Manifold Portion of the Filter System (FIG. 10)

FIG. 10 shows an exploded view including manifold housing 102 output port 104, ring 106, peg-protrusion 108, connector 110, hook 112, and input port 326. Manifold housing 102 also includes base 802 and flanges 804 and 806. Filter system 100 also includes springs 808 and 810, valve supports 812 and 814, valve springs 816 and 818, valve pegs 820 and 822, peg rings 824 and 826, o-rings 828, 830, 832, and 834, fluid distributor 835 having output conduit 836 and input conduit 838. Output conduit 836 and input conduit 838 includes slots 840. Output conduit 836 also includes o-ring groove 842, and input conduit 838 includes o-ring grooves 844 and 846. Output conduit 836 also includes o-ring groove 1002. In other embodiments, the manifold portion of filter system 100 may include additional components and/or may not include all of the components listed above.

Manifold housing 102 output port 104, ring 106, peg-protrusion 108, connector 110, hook 112, and input port 326 were discussed in conjunction with FIGS. 1-7. Base 802 and flanges 804 and 806, springs 808 and 810, valve supports 812 and 814, springs 816 and 818, valve pegs 820 and 822, peg rings 824 and 826, o-rings 828, 830, 832, and 834, fluid distributor 835, output conduit 836 and input conduit 838, slots 840 o-ring groove 842, o-ring grooves 844 and 846 were discussed in conjunction with FIG. 8. Although optional, o-ring groove 1002 holds o-ring 832. O-ring groove 1002 was hiding from view in FIG. 8.

Second Exploded View of the Canister Portion of the Filter System (FIG. 11)

FIG. 11 shows the removable portion of filter system 100. FIG. 11 includes canister 118, connector 120, grip 122, and handle cover 124, which were discussed in conjunction with FIGS. 1-7. FIG. 11 also includes neck-extension o-ring 902, neck extension 904 having groove 906 and screw threads 908, and o-ring 910. Canister 118 includes neck groove 912, neck 914, flange 916, screw threads 918, and notch 920. FIG. 11 also shows o-ring 924, top filter cover 926 having groove 928, rim 930, and plate 934. FIG. 9 also shows filter 936 having filter cavity 938. FIG. 9 includes bottom cap 940 having plate 942, rim 944, protrusions 945, and handle 946. FIG. 9 also shows o-ring 948. Handle cover 124 includes groove 950 and protrusion 952. In other embodiments, the canister portion of filter system 100 may include additional components and/or may not include all of the components listed above.

In FIG. 11 extension 932 of top filter cover 926 is hidden from view, whereas in FIG. 9 extension 1102 is hidden from view. In FIG. 9 the bottom of plate 334 and the top of plate 942 is visible, whereas in FIG. 11 the top of plate 334 and the bottom of plate 942 is visible. Similar to extension 932, extension 1102 may aid in keeping the filter 936 from moving sideways and may aid in keeping unfiltered fluids from bypassing filter 936.

Bottom Views of the Manifold Portion of the Filter System

Figure 13:
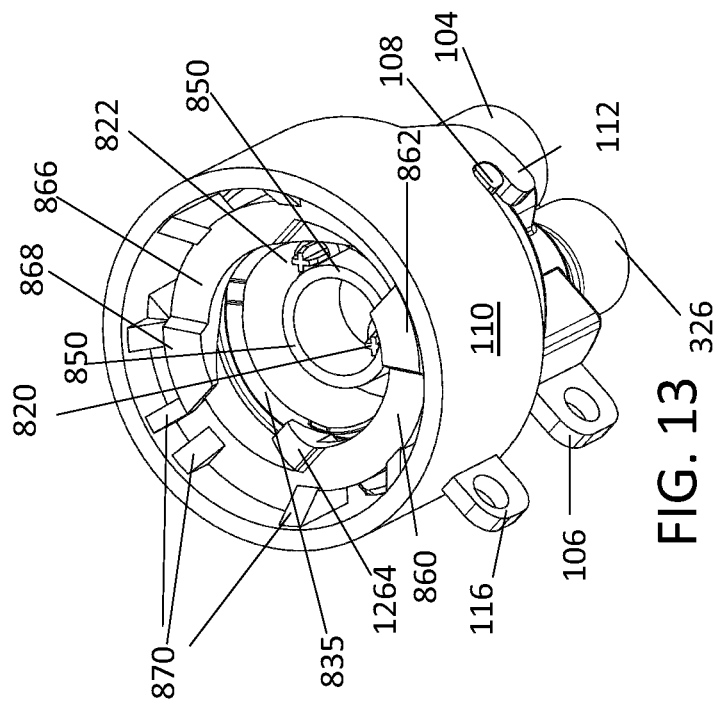
FIG. 13 shows a bottom perspective view of an embodiment of the manifold portion of filter system.
Figure 12:
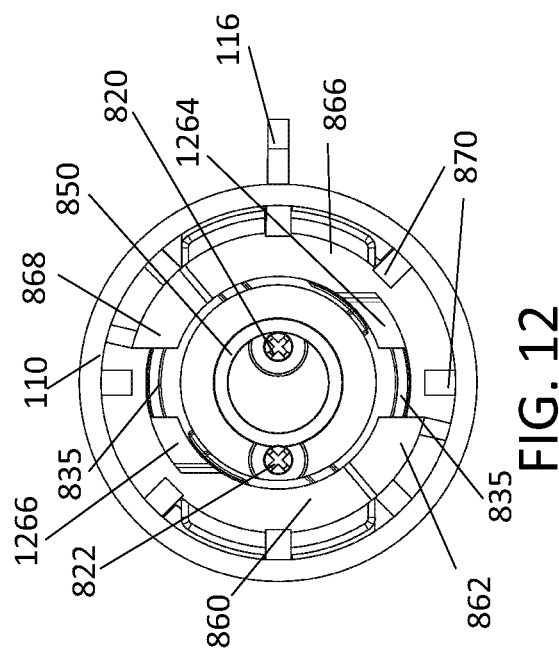
FIG. 12 is a bottom view of an embodiment of the manifold portion of the filter system.

FIG. 12 is a bottom view of an embodiment of the manifold portion of filter system 100 and FIG. 13 shows a bottom perspective view of an embodiment of the manifold portion of filter system 100.

The manifold portion of FIG. 12 may include connector 110, ring 116, valve pegs 820 and 822, and fluid distributor 835. Fluid distributor 835 may include conduit divider 850. Connector 110 includes flange 860 having raised portions 862 and 864. Connector 110 also includes flange 866 having raised portion 868, and connector 110 includes struts 870. Fluid distributor 835 may include holes 1202 and 1204. Connector 110 may include sloped portions 1264 and 1266. In other embodiments filter connector 110 may not have all of the elements or features listed and/or may have other elements or features instead of or in addition to those listed.

Connector 110 and ring 116 were discussed in connection with FIGS. 1-7. Valve pegs 820 and 822 fluid distributor 835, conduit divider 850, flange 860, raised portions 862 and 864, flange 866, raised portion 868, and struts 870 were discussed in conjunction with FIG. 8. FIG. 12 additionally shows how valve peg 820 aligns with a region interior to conduit divider 850, whereas valve peg 822 is aligned with a region that is exterior to conduit divider 850 and between outer walls of conduit divider 820 and inner walls of fluid distributor 835. Sloped portion 1264 is a sloped portion facing away from manifold housing 102, which is on an underside of raised portion 864 (FIG. 8). Similarly sloped portion 1266 is a sloped portion that is 180 degrees apart from sloped portion 1264, and sloped portion 1266 is the underside of a raised portion that is 180 degrees apart from raised portion 864. Sloped portions 1264 and 1266 catch sloped portions on flanges, such as flange 916, on the canister neck 914, when canister 118 is rotated counter clockwise to remove canister 118 from the manifold portion of filter system 100, thereby making it easier to remove canister 118 than were sloped portions 1264 and 1266 not present.

The manifold portion of FIG. 13 may include output conduit 104, ring 106, peg 108, connector 110, hook 112, ring 116, input conduit 326, valve pegs 820 and 822, and fluid distributor 835. Fluid distributor 835 may include conduit divider 850. Connector 110 includes flange 860 having raised portions 862. Connector 110 also includes flange 866 having raised portion 868, and connector 110 includes struts 870. Connector 110 may include sloped portion 1264.

Output conduit 104, ring 106, peg 108, connector 110, hook 112, ring 116, and input conduit 326 were discussed in connection with FIGS. 1-7. Valve pegs 820 and 822 fluid distributor 835, conduit divider 850, flange 860, raised portions 862, flange 866, raised portion 868, and struts 870 were discussed in conjunction with FIG. 8. Sloped portion 1264 was discussed in conjunction with FIG. 12. FIG. 13 additionally shows how, in an embodiment, the end of valve peg 820 sticks through one of the valve holes (into a region interior to conduit divider 850), whereas an end of valve peg 822 sticks through another valve hole (into a region that is exterior to conduit divider 850 and between outer walls of conduit divider 820 and inner walls of fluid distributor 835), so that when canister 118 is inserted into the manifold portion, canister 118 pushes upon the ends of valve pegs 820 and 822 (e.g., via the rim of canister neck 916 and neck extension 904 pushing on the ends of valve pegs 820 and 822) to open the input and output valves within input conduit 836 and output conduit 838 (FIG. 8), so that fluids can flow into and out of canister 118.

Cannister 118

FIGS. 14-17 show different views of an embodiment of canister 118. FIG. 14 shows an embodiment of a first side of canister 118. FIG. 15 shows an embodiment of a second side of canister 118, which is oriented 90 degrees with respect to the first side view of FIG. 14. FIG. 16 shows a top perspective view of an embodiment of canister 118 and FIG. 17 shows a bottom perspective view of an embodiment of canister 118. The side view of canister 118 that is 180 degrees from that of FIG. 14 looks identical to FIG. 14, and the side view of canister 118 that is 180 degrees from that of FIG. 15 looks identical to FIG. 15.

In an embodiment, canister 118 includes neck groove 912, neck 914, flange 916 (FIGS. 14, 16, and 17), screw threads 918, and notches 920 (FIGS. 16 and 17) and 922 (FIGS. 14 and 17). Canister 118 may also include flange 1416 (FIGS. 14-17), which in-turn includes slopes 1518 and 1520 (FIG. 15). Canister 118 also includes struts 1602 (FIG. 16). In other embodiments canister 118 may not have all of the elements or features listed and/or may have other elements or features instead of or in addition to those listed.

Canister 118 was discussed in conjunction with FIGS. 1-7 and 9. Neck groove 912, neck 914, flange 916 (FIGS. 14, 16, and 17), screw threads 918, and notches 920 (FIGS. 16 and 17) were discussed in conjunction with FIG. 9. Notch 922 is discussed in conjunction with FIGS. 9 and 11. Flange 1416 (FIGS. 14-17) may have the same structure as flange 916, but is located on neck 914 at a location that is 180 degrees from neck 916. Referring to FIG. 15, protrusion 916 has slopes that have the same structure as slopes 1516 and 1518. Slopes 1516 and 1518 guide neck 914 so as to engage with flanges 860 and 866 (FIGS. 8, 12 and 13), when rotated clockwise and counter clockwise. Slope 1516 and the corresponding slope on flange 916 are guided by the sloped surface on the underside of raised portion 862 or 868, when attaching canister 118 to the manifold portion of the filter system 100 (e.g., while canister 118 is rotated clockwise). Slope 1518 and the corresponding slope on flange 916 are guided by slopes 1264 or 1266, when de-attaching canister 118 to the manifold portion of the filter system 100 (e.g., while canister 118 is rotated clockwise). Another embodiment of filter system 100 may be obtained by orienting the raised portions and sloped surfaces of FIGS. 12 and 13 and of the flanges 1260 and 1266, 916, and 1516 to form a mirror images of the slopes FIGS. 12-17. In the embodiment in which the raised portions and sloped surfaces of FIGS. 12 and 13 and of the flanges 1260 and 1266, 916, and 1516 are oriented to form a mirror images of the slopes FIGS. 12-17, rotating canister 118 clockwise detaches canister 118 from the manifold portion of filter system 100 and rotating canister 118 counter clockwise attaches canister 118 to the manifold portion of filter system 100.

Struts 1602 (FIG. 16) may support a socket for attaching neck extension 904 (FIG. 9) to neck 914. Struts 1602 may also strengthen neck 914, so as to better withstand repeated connecting and disconnecting of canister 118 from the manifold portion of filter system 100. Additionally, struts 1602 are sloped, having a narrower portion at an end of struts 1602 that is closest to the opening in into canister 118, which is the opening in neck 914 that is furthest from the rest of the body of canister 118. The shape of struts 1602 help guide neck extension 904 (FIG. 9) into a socket within neck 914 to which neck extension 904 is attached. In other embodiments, there may be a different number of struts than illustrated and the struts may have a different shape.

Figure 19:
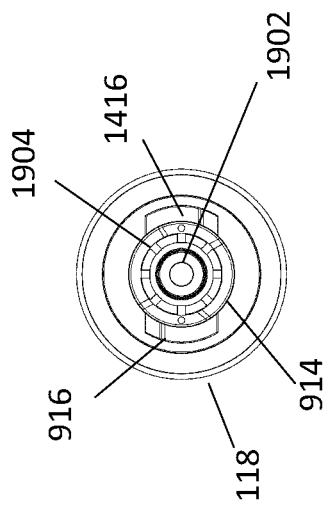
FIG. 19 shows a top view of an embodiment of the canister.
Figure 18:
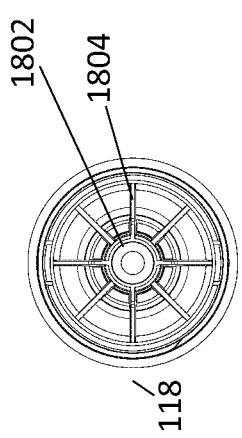
FIG. 18 shows a bottom view of an embodiment of the canister.

FIGS. 18 shows a bottom view of canister 118. Bottom view of canister 118 includes socket bottom 1802 and strut bottom 1804. FIGS. 19 shows a top view of canister 118 having flanges 916 and 1416. Top view of canister 118 includes socket top 1902 and strut tops 1904. In other embodiments canister 118 may not have all of the elements or features listed and/or may have other elements or features instead of or in addition to those listed.

Canister 118 was discussed in conjunction with FIGS. 1-7, and flanges 916 and 1416 were discussed in conjunction with FIGS. 9 and 14, respectively. Socket bottom 1802 and socket top 1902 are embodiments of the top and the bottom of the socket to which neck extension 904 is attached. Strut bottoms 1804 and strut tops 1904 are embodiments of the tops and bottoms of struts 1602 (FIG. 16), which suspend the socket having socket bottom 1802 and/or socket top 1902 within the neck 914 (e.g., the middle of the opening of the neck 914). Fluids entering canister 118 pass through struts 1602 and fluids exiting canister 118 exit via neck extension 904, which is installed within the socket having socket bottom 1802 and/or socket top 1902. In an alternative embodiment, there may be a different number of struts and/or a different structure instead of the struts. For the example, the struts maybe replaced with a flat surface having circular holes or holes of another shape.

Connector 120

Figure 21:
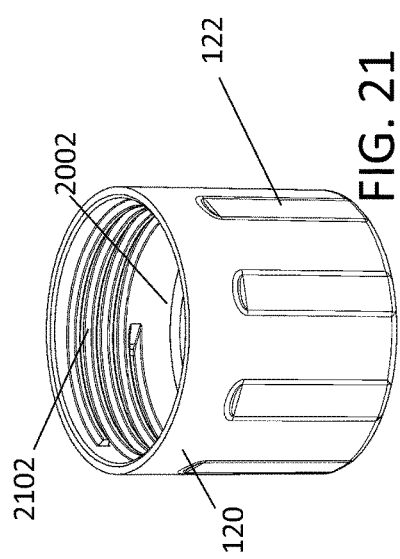
FIG. 21 shows a top perspective view of an embodiment of the connector.
Figure 23:
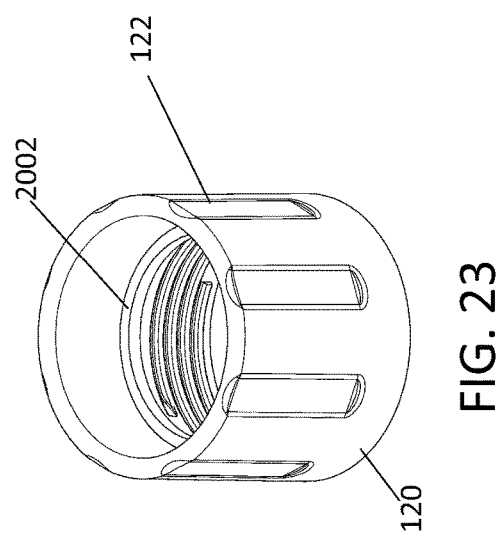
FIG. 23 shows a bottom perspective view of an embodiment of the connector.
Figure 20:
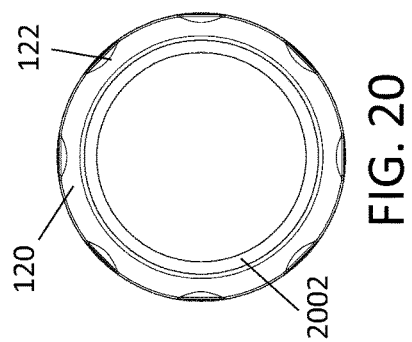
FIG. 20 shows a bottom view of an embodiment of the connector.
Figure 22:
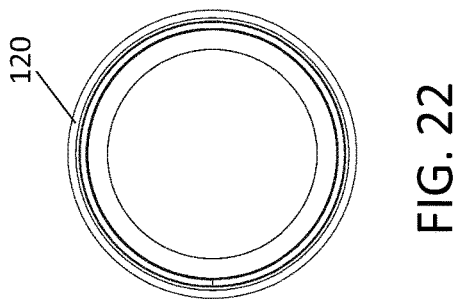
FIG. 22 shows a top view of an embodiment of the connector.

FIGS. 20-23 show different views of connector 120. FIG. 20 shows a bottom view of an embodiment of connector 120. FIG. 21 shows a top perspective view of an embodiment of connector 120. FIG. 22 shows a top view of an embodiment of connector 120. FIG. 23 shows a bottom perspective view of an embodiment of connector 120.

The embodiment of FIGS. 20-23 of connector 120 includes grip 122 (FIGS. 20, 21 and 23), flange 2002 and threads 2102 (FIGS. 21 and 23). In other embodiments connector 120 may not have all of the elements or features listed and/or may have other elements or features instead of or in addition to those listed.

Connector 120 and grip 122 were discussed in conjunction with FIGS. 1-7 and 9. Flange 2002 forms a ledge or protrusion that pushes down the edges of handle cover 124 to hold handle cover in place and on the end of the canister furthest from the manifold portion of filter system 100. Threads 2102 (FIGS. 21 and 23) connect connector 120 to threads 918 of canister 118, thereby holding handle cover 124 and bottom cap 940 in place on canister 118.

Handle Cover 124

FIGS. 24-26 show different views of an embodiment of handle cover 124. FIG. 24 shows a side view of an embodiment of handle cover 124. FIG. 25 shows a top view (a view of the side facing the manifold portion) of an embodiment of handle cover 124. FIG. 26 shows a top perspective view of an embodiment of handle cover 124.

Handle cover 124 includes groove 950 (FIGS. 24 and 26), protrusions 952 (FIGS. 24-26) and 2402 (FIGS. 24-26), handle portion 2404 (FIGS. 24 and 26), brim 2406 (FIGS. 24-26), and well 2502 (FIGS. 25 and 26). In other embodiments handle cover 124 may not have all of the elements or features listed and/or may have other elements or features instead of or in addition to those listed.

Groove 950 and protrusion 952 were discussed in conjunction with FIG. 9. Protrusion 2402 is similar to protrusion 952, but is located 180 degrees from protrusion 952. Protrusion 2402 engages one of notches 920 and 922, whereas protrusion 952 engages the other of notches 920 and 922, so as to keep handle cover aligned with canister 118, so that rotating handle cover 124 also rotates canister 118, which causes canister 118 to attach or detach from the manifold portion of system 100, depending on the direction in which handle cover (and therefore canister 118) is rotated. By having handle cover 124 as a separate component than connector 120, handle cover 124 may be rotated to cause canister 118 to rotated in either direction, via protrusion 2402 engages one of notches 920 and 922, and protrusions 952 and 2402, without unscrewing connector 120 from canister 118.

Handle portion 2404 may be gripped by the user so that the user may rotate canister 118 attaching or detaching canister 118 from the manifold portion of filter system 100. Brim 2502 is a protrusion of flanges that extends outward from handle cover 124. Protrusions 952 and 2402 are attached to and rise above brim 2406, towards the manifold portion of filter system 100. When handle cover 124 is held onto canister 118 by connector 110, flange 2002 pushes down on brim 2406, which in turn pushes down on filter cover 940. In an embodiment, the pressure from flange 2002, transmitted via brim 2406 keeps filter cover 940 and filter cover 930 pressed against filter 936 so as to form a fluid tight connection, preventing (or preventing most or at least hindering) unfiltered water from bypassing filter 936.

In an embodiment, protrusions 952 and 2402 are wider at the location where protrusions 952 and 2402 meet brim 2406 and get narrower as protrusions 952 and 2402 extend away from brim 2406, so that it is easier to align protrusions 952 and 2402 with notches 920 and 922 (however, in other embodiments protrusions and notches may have another shape).

Well 2502 is a cavity within handle portion 2404. In an embodiment, a portion of handle 946 extends into well 2502. The larger handle 946 is, the easier it is to grab handle 946, and well 2502 allows handle 946 to be larger than were well 2502 filled in. In an embodiment, handle 946 does not extend so far into well 2502 that handle cover 124 that would limit the orientation of handle 946, so as to simplify assembling canister 118, after filter 936 is replaced.

Connector 110

FIGS. 27-30 show different views of an embodiment of connector 110. FIG. 27 shows a bottom view of an embodiment of connector 110. FIG. 28 shows a top perspective view of an embodiment of connector 110. FIG. 29 shows a top view of an embodiment of connector 110. FIG. 30 shows a bottom perspective view of an embodiment of connector 110.

Connector 110 includes hook 112 (FIGS. 27-30), flange 860 (FIGS. 27-30) having raised portion 862 (FIGS. 27 and 30). Connector 110 also includes flange 866 (FIGS. 27-30) having raised portion 868 (FIGS. 28 and 30). Connector 110 may include sloped portions 1264 and 1266 (FIGS. 27 and 30), flange structure 2802 (FIGS. 28 and 29), flange structure 2804 (FIGS. 28 and 29), stop 2806 (FIG. 28), ring 2808 (FIGS. 28 and 29), protrusions 2810 and 2812 (FIGS. 28 and 29), flange structure 2902, and flange structure 2904 (FIG. 29). In other embodiments, connector 110 may not have all of the elements or features listed and/or may have other elements or features instead of or in addition to those listed.

Connector 110 and hook 112 were discussed in conjunction with FIGS. 1-7. Flange 860, raised portions 862 and 864, flange 866 and raised portion 868 were discussed in conjunction with FIGS. 8, 12, and 13. Sloped portions 1264 and 1266 were discussed in conjunction with FIGS. 12 and 13.

Flange structure 2802 (FIGS. 28 and 29) and flange structure 2804 (FIGS. 28 and 29) interact with flange 806 of manifold housing 102. Manifold housing 102 is inserted into connector 110 such that flange 806 is to the left of flange structures 2802 and 2804. Then manifold 102 is rotated such that flange 806 (FIGS. 8, 12 and 13) is under flange structure 2802 and 2804 to help hold manifold 102 connected to connector 110. Stop 2806 (FIG. 28) prevents flange 806 from being rotated too far, and prevents flange 804 from being rotated in the wrong direction and then under flange structures 2802 and 2804. Ring 2808 (FIGS. 28 and 29) is a flange that is suspended from the interior wall of connector 110.

Protrusions 2810 and 2812 (FIGS. 28 and 29) are protrusions that protrude from ring 2808. Protrusions 2810 and 2812 (FIGS. 28 and 29) engage notches 854 and 856 of fluid distributor 835 to keep fluid distributor 835 aligned. When canister 118 is disconnected from the manifold portion of system 100, fluid distributor 835 rests over protrusions 2810 and 2812, while protrusions 2810 and 2812 are within notches 854 and 856. In another embodiment, when canister 118 is disconnected from the manifold portion of system 100, fluid distributor 835 rests on protrusions 2810 and 2812, while protrusions 2810 and 2812 are within notches 854 and 856.

Flange structure 2902 and flange structure 2904 (FIG. 29) are similar to flange structures 2802 and 2804. However, flange structures 2902 and 2904 are 180 degrees from flange structures 2802 and 2804. Also, when flange 806 slides under flange structures 2802 and 2804, flange 804 slides under flange structures 2902 and 2904. Sloped portions 2862 and 2868 are on the underside of raised portions 862 and 868. Slope 1516 (FIG. 15) and the corresponding slope on flange 916 (FIG. 9) are guided by the sloped portions 2862 and 2868 on the underside of raised portion 862 or 868 (FIG. 8), when attaching canister 118 to the manifold portion of the filter system 100 (e.g., while canister 118 is rotated clockwise). Optionally, although it may not work as well, a different mechanism is used for connecting manifold housing 102 to connector 110, that does not require flange 806, flange structures 2802 and 2804, and flange 806. For example, screw threads, latches, and/or more pegs and hooks may be used.

Manifold Housing 102

FIGS. 31-33 show different views of an embodiment of manifold housing 102. FIG. 31 shows a bottom view of an embodiment of manifold housing 102. FIG. 32 is a top perspective view of an embodiment of manifold housing 102. FIG. 33 is a bottom perspective view of an embodiment of manifold housing 102.

Manifold housing 102 includes output port 104 (FIGS. 31-33), peg-protrusion 108 (FIGS. 31-33), input port 326 (FIGS. 31-33), peg protrusion 408 (FIGS. 31 and 33), flanges 804 and 806 (FIGS. 31-33), chamber 3102 and 3104 (FIGS. 31-33), and valve holes 3106 and 3108 (FIG. 31). In other embodiments manifold housing 102 may not have all of the elements or features listed and/or may have other elements or features instead of or in addition to those listed.

Output port 104 (FIGS. 31-33), peg-protrusion 108 (FIGS. 31-33), input port 326 (FIGS. 31-33), and peg protrusion 408 (FIGS. 31 and 33) were discussed conjunction with FIGS. 1-7. Flanges 804 and 806 were discussed in conjunction with FIG. 8.

Chambers 3102 and 3104 (FIGS. 31-33) house and anchor springs 808 and 810, respectively.

Fluid Distributor 835

FIGS. 34-37 shows different views of an embodiment of fluid distributor 835. FIG. 34 shows a bottom view of an embodiment of fluid distributor 835. FIG. 35 shows a top view of an embodiment of fluid distributor 835. FIG. 36 shows an embodiment of a top perspective view of fluid distributor 835. FIG. 37 shows an embodiment of a bottom perspective view of fluid distributor 835.

Fluid distributor 835 includes output conduit 836, input conduit 838, slots 840, conduit divider 850, sloped region 852, notches 854 and 856, sloped region 858, notches 3502, 3504, 3506, and 3508, valve holes 3510 and 3512 (FIG. 35), and flange 3602 (FIG. 36). In other embodiments, fluid distributor 835 may not have all of the elements or features listed and/or may have other elements or features instead of or in addition to those listed.

Output conduit 836, input conduit 838, slots 840, conduit divider 850, sloped region 852, notches 854 and 856, and sloped region 858 were discussed in conjunction with FIG. 8.

Notches 3502, 3504, 3506, and 3508 receive the tabs at the bottom of valve supports 812 and 814. Notches 3502, 3504, 3506, and 3508 guide the tabs at the bottom of valve supports 812 and 814 to slot 840 (where the tabs engage and attach to slots 840).

Valve holes 3510 and 3512 are the holes that are opened and closed by valve pegs 820 and 822. The ends of valve pegs 820 and 822 stick through valve holes 3106 and 3108. The majority of each of valve pegs 820 and 822 and valve rings 824 and 826 rest on the side of valve holes 3106 and 3108 that faces away from canister 118. Flange 3602 helps keep fluid distributor 835 properly vertically aligned within manifold housing 102.

Valve Support 812

Figure 38:
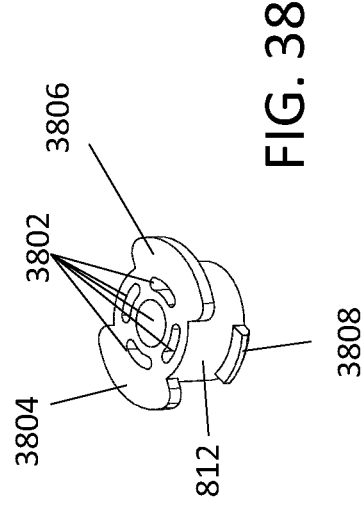
FIG. 38 shows an embodiment of the valve support.

FIG. 38 shows an embodiment of valve support 812. Valve support 812 includes holes 3802, wings 3804 and 3806, and tab 3808. In other embodiments, valve support 812 may not have all of the elements or features listed and/or may have other elements or features instead of or in addition to those listed.

Valve support 812 is the same as valve support 814 (FIG. 8). Holes 3802 allow fluids to pass through valve support 812. Holes 3802 may also anchor valve springs 816 and 818. Holes 3802 may include 5 holes—one circular hole in the center, surrounded by four holes having a banana shape or an oval shape except that the ovals are have a curved shape. Wings 3804 are flanges or protrusions protruding from the core of valve support 812, which prevent valve support 812 from sliding too far into output conduit 836 and input conduit 838. When valve support 812 is installed in one of output conduit 836 and input conduit 838, wings 3804 and 3806 rest on the rim of output conduit 836 or input conduit 838 (depending on whether valve support 812 is installed in output conduit 836 or input conduit 838). Tab 3808 is installed in one of slots 840. Valve 812 has a second tab similar to tab 3808 that is hidden from view in FIG. 38 (but is visible in FIG. 8).

Valve Peg 820

Figure 40:
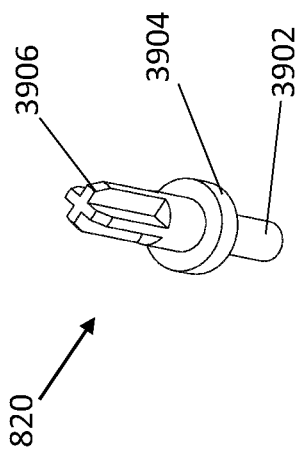
FIG. 40 is a bottom perspective views of an embodiment of the valve peg.
Figure 39:
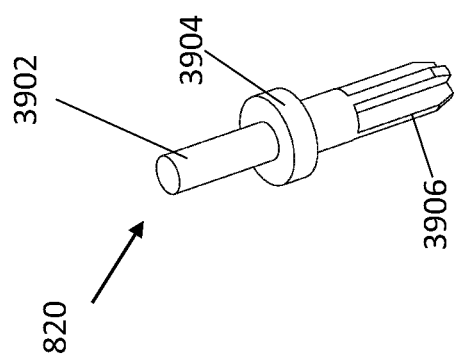
FIG. 39 is a top perspective views of an embodiment of the valve peg.

FIGS. 39 and 40 show different perspectives of an embodiment of valve peg 820. FIG. 39 is a top perspective views of an embodiment of valve peg 820. FIG. 40 is a bottom perspective views of an embodiment of valve peg 820.

Valve peg 820 includes tail 3902, ring 3904, and head 3906. In other embodiments, valve peg 820 may not have all of the elements or features listed and/or may have other elements or features instead of or in addition to those listed.

Valve spring 816 is attached to (e.g., wrapped around) tail 3902. Ring 3904 is a flange protruding from valve peg 820 that closes the valve by covering valve hole 3510 or 3512. Head 3906 sticks through one of valve holes 3510 and 3512 (depending where valve peg 820 is installed). Optionally head 3906 includes fins (e.g., two three, four, five, six, seven, or eight fins) and comes to a point rather than being a solid cylindrical piece of material that optionally has a point at the end of the head 3906. The fins allow more fluid to pass when the valve is open.

Materials for Fluid Tight Connections

The o-rings, the valve rings, and any other seal of this specification may be a circular loop of elastomer, which may be is made of rubber, silicon, or any other soft and/or resilient fluid tight materials. In an embodiment any of the O-rings of this specification may be made from any gummy, rubbery material, elastomer, nonporours, and/or flexible material that prevents fluids from leaking. Some nonlimiting examples of materials that may be used for the O-rings are natural rubber, polyacrylate rubber, ethylene-acrylate rubber, polyester urethane, bromo isobutylene isoprene bromobutyl, polybutadiene buna, chloro isobutylene isoprene chlorobutyl, buty polychloroprene chloroprene, neoprene, chlorosulphonated polyethylene hypalon, epichlorohydrin, epichlorohydrin, epichlore, epichloridrine, herclor, hydrin, ethylene propylene, ethylene propylene diene monomer, nordel, polyether urethane, perfluorocarbon rubber, kalrez, chemraz, fluoronated hydrocarbon viton, fluorel, fluoro silicone, silicone rubber, fluorocarbon rubber, hydrogenated nitrile butadiene, polyisoprene (synthetic) natural rubber, isobutylene isoprene butyl butyl, acrylonitrile butadiene, nitrile, perbunan, buna-N, polyurethane, polyurethane, styrene butadiene, buna-S, GRS, buna VSL, buna SE, styrene ethylene butylene styrene copolymer rubber, polysiloxane silicone rubber, vinyl methyl silicone, silicone rubber, acrylonitrile butadiene carboxy monomer, carboxylated nitrile, styrene butadiene carboxy monomer, thermoplastic polyether-ester, styrene butadiene block copolymer, and/or styrene butadiene carboxy block copolymer.

In this specification, any part that is intended to form a seal with an o-ring or another component so that fluids will not leak may be made from a nonporous material, such as plastic or metal. Some non-limiting examples of nonporous plastics that may be used for the filter cap 240 or the inner surface of top protrusion 242 and/or other components used for creating a seal are Polyethylene Terephthalate (PET), High-Density Polyethylene (HDPE), Acrylonitrile Butadiene Styrene (ABS), Polyvinyl Chloride (PVC) or Polypropylene (PP).

Fluid Flow Through Canister 118.

Figure 42:
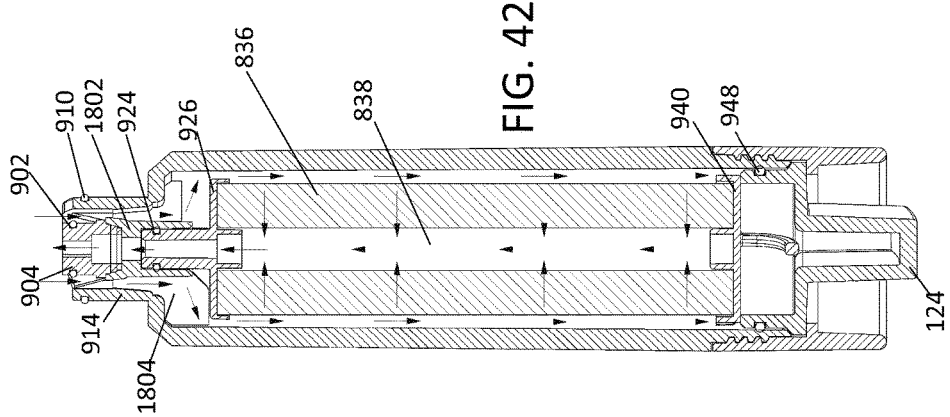
FIG. 42 shows cross sectional view of an embodiment of the canister, where the cross section is taken along a cut line that is perpendicular to the cut line of FIG. 41.
Figure 41:
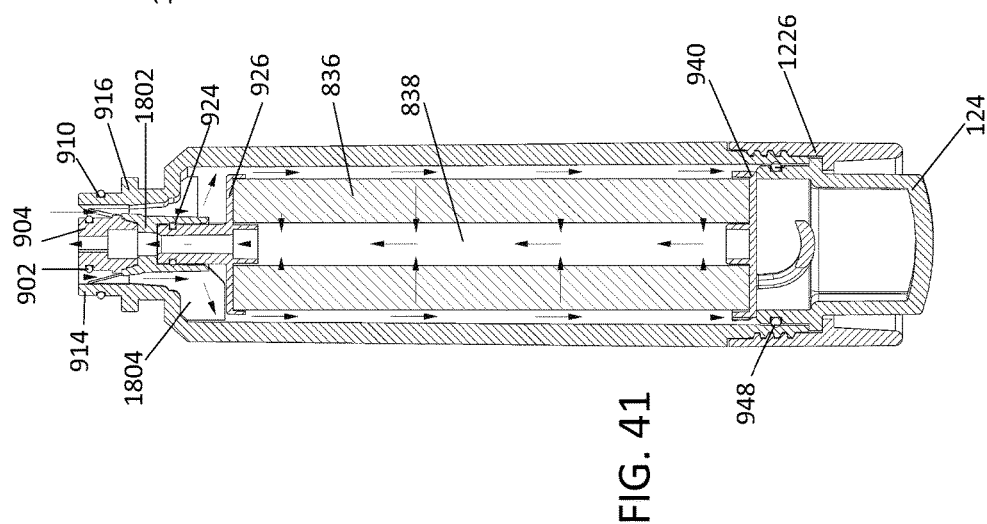
FIG. 41 shows a cross sectional view of an embodiment of the canister, where the cross section is taken along a cut line that cuts through the center of flanges on the neck of the canister.

FIGS. 41 and 42 show two cross sectional views of an embodiment of canister 118 showing the direction of flow of fluids through canister 118. Canister 118 includes connector 110, handle cover 124, neck-extension o-ring 902, neck extension 904, o-ring 910, neck 914, flange 916, notches 920 and 922, o-ring 924, top filter cover 926, extension 932, filter 936, filter cavity 938, bottom cap 940, o-ring 948, socket 1802, and struts 1804. In other embodiments, the canister portion of canister 118 may include additional components and/or may not include all of the components listed above.

As shown in FIGS. 41 and 42, incoming unfiltered fluids enter canister 118 in the space between the outer edge of the socket 1802 and the inner edge of the neck of the canister 118, passing between the spaces of struts 1804 into a region exterior to filter 836, through the walls of filter 836 into filter cavity 838, and then exits canister 118 by traveling through top filter cover 926, and through neck extension 932, and out of canister 118. The unfiltered fluid is prevented from bypassing the walls of filter 936 by top filter cover 926 and bottom cap 940. In the embodiment of FIGS. 41 and 42, when installed in socket 1802, the top of neck extension 904 is the same height as the higher portion of the rim of neck 914 (as shown in FIG. 41), and higher than the lower portion of neck extension the rim of neck 914 (as shown in FIG. 42).

Closed Valve Cross Sections of Manifold Portion of Filter System 100

FIGS. 43-45 show different cross sections of the manifold portion 801 of filter system 100 with the valve closed. FIG. 43 shows a cross section of the manifold portion 810 taken along a cut line through the middle of both valve pegs. FIG. 44 is a cross section of the manifold portion 801 of the filter system taken at a cutline that is perpendicular to the cutline of FIG. 43 and that runs through the middle of output valve peg. FIG. 45 is a cross section of the manifold portion 801 of the filter system taken at a cutline that is perpendicular to the cutline of FIG. 43 and that runs through the middle of input valve peg.

The cross section of the manifold portion 801 of filter system 100 includes manifold housing 102, output port 104, ring 106, connector 110, hook 112, and input port 326. The cross section of the manifold portion 801 of filter system 100 includes flanges 804 and 806, springs 808 and 810, valve supports 812 and 814, valve springs 816 and 818, valve pegs 820 and 822, peg rings 824 and 826, and 834, fluid distributor 835, output conduit 836, input conduit 838, slots 840, input conduit 838, conduit divider 850, notch 854, flange 860, flange 866, raised portion 868, and struts 870. The cross section of the manifold portion 801 of filter system 100 also includes ring 1602, flange structure 2804 and 2902, and ring 2808. In other embodiments, the manifold portion 801 of filter system 100 may include additional components and/or may not include all of the components listed above.

Manifold housing 102, output port 104, ring 106, connector 110, hook 112, and input port 326 were described in conjunction with FIGS. 1-7. Flanges 804 and 806, springs 808 and 810, valve supports 812 and 814, valve springs 816 and 818, valve pegs 820 and 822, peg rings 824 and 826, and 834, fluid distributor 835, output conduit 836, input conduit 838, slots 840, input conduit 838, conduit divider 850, notch 854, flange 860, flange 866, raised portion 868, and struts 870 were described in conjunction with FIG. 8. Ring 1602 was discussed in conjunction with FIG. 16, Flange structure 2804, ring 2808, and flange structure 2902 were discussed in conjunction with FIGS. 28 and 29.

Cross Section of Filter System with Canister Attached and the Valves Open

Figure 46:
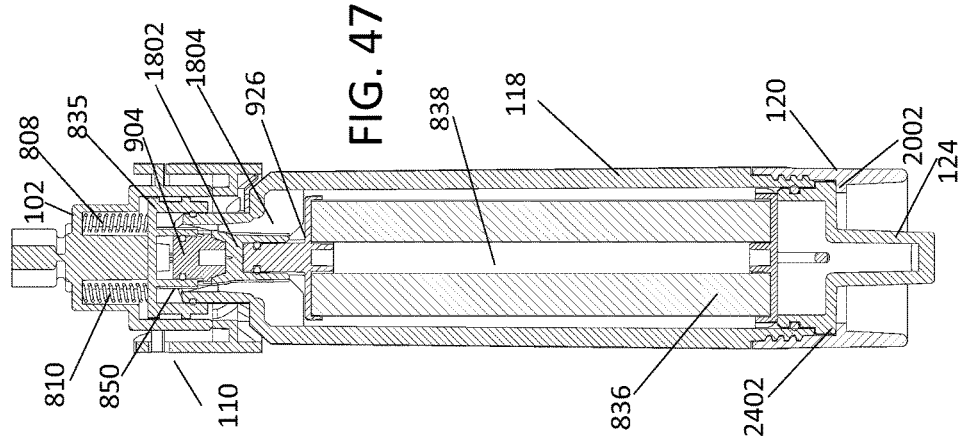
FIG. 46 shows a cross section of an embodiment of the filter system taken along a cut line passing through the center of both valve pegs.
Figure 47:
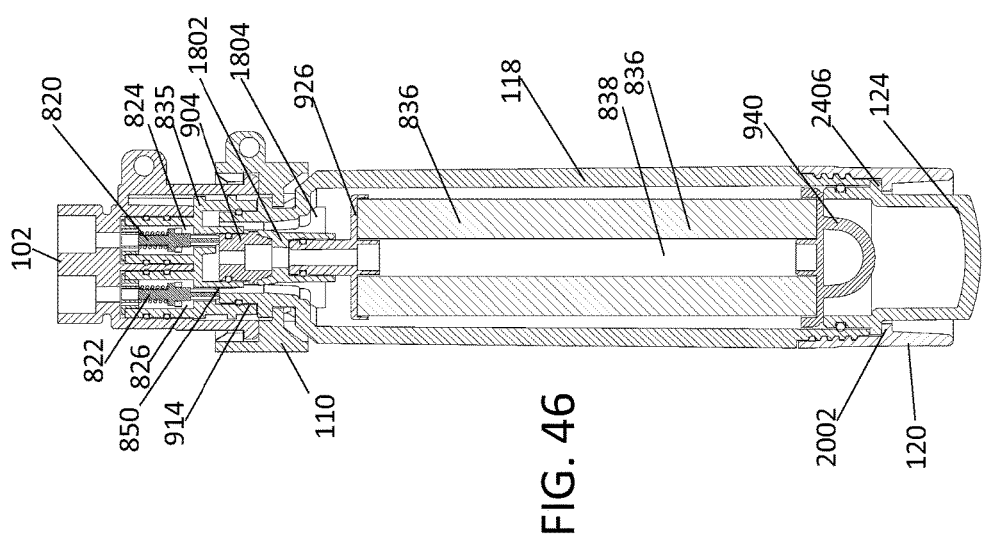
FIG. 47 shows a cross section of an embodiment of the filter system taken along a cut line passing through the center of the filter system, where the cutline of FIG. 47 is perpendicular to the cutline of the FIG. 46.

FIGS. 46 and 47 show an embodiment of a cross section of filter system 100 with canister 118 attached to the manifold portion 801. FIG. 46 shows a cross section of an embodiment of the filter system 100 taken along a cut line passing through the center of both valve pegs. FIG. 47 shows a cross section of an embodiment of the filter system 100 taken along a cut line passing through the center of the filter system, where the cutline of FIG. 47 is perpendicular to the cutline of FIG. 46.

Filter system 100 includes manifold housing 102, output port 104, ring 106, connector 110, hook 112, canister 118, connector 120, handle cover 124, and input port 326. The cross section of the manifold portion of filter system 100 includes flanges 804 and 806, springs 808 and 810, valve supports 812 and 814, valve springs 816 and 818, valve pegs 820 and 822, peg rings 824 and 826, and 834, fluid distributor 835, output conduit 836, input conduit 838, slots 840, input conduit 838, conduit divider 850, neck extension 904, neck 914, flange 916, top filter cover 926, extension 932, filter 936, filter cavity 938, bottom cap 940, socket 1802, struts 1804, flange 2002, and brim 2406. In other embodiments, the filter system 100 may include additional components and/or may not include all of the components listed above.

Manifold housing 102, output port 104, ring 106, connector 110, hook 112, canister 118, connector 120, handle cover 124, and input port 326 were describe in conjunction with FIGS. 1-7. Flanges 804 and 806, springs 808 and 810, valve supports 812 and 814, valve springs 816 and 818, valve pegs 820 and 822, peg rings 824 and 826, and 834, fluid distributor 835, output conduit 836, input conduit 838, slots 840, input conduit 838, and conduit divider 850 were described in conjunction with FIG. 8. Neck extension 904, neck 914, flange 916, top filter cover 926, extension 932, filter 936, filter cavity 938, and bottom cap 940 were described in conjunction with FIG. 9. Socket 1802 and struts 1804 were described in conjunction with FIGS. 18 and 19. Flange 2002 was described in conjunction with FIG. 10. Brim 2406 was described in conjunction with FIG. 24.

FIGS. 46 and 47 show another cross sectional view of struts 1804 supporting socket 1802, and neck extension 904. FIGS. 46 and 47 show among other things how brim 2406 is pressed by flanges 2002 into the rim of canister 118.

In FIGS. 46 and 47 the valves are open.

The noncircular shape of the hole at the top of neck extension 904 facilitates screwing neck extension in and out of neck 914 of canister 118.

Method of Use

Figure 48:
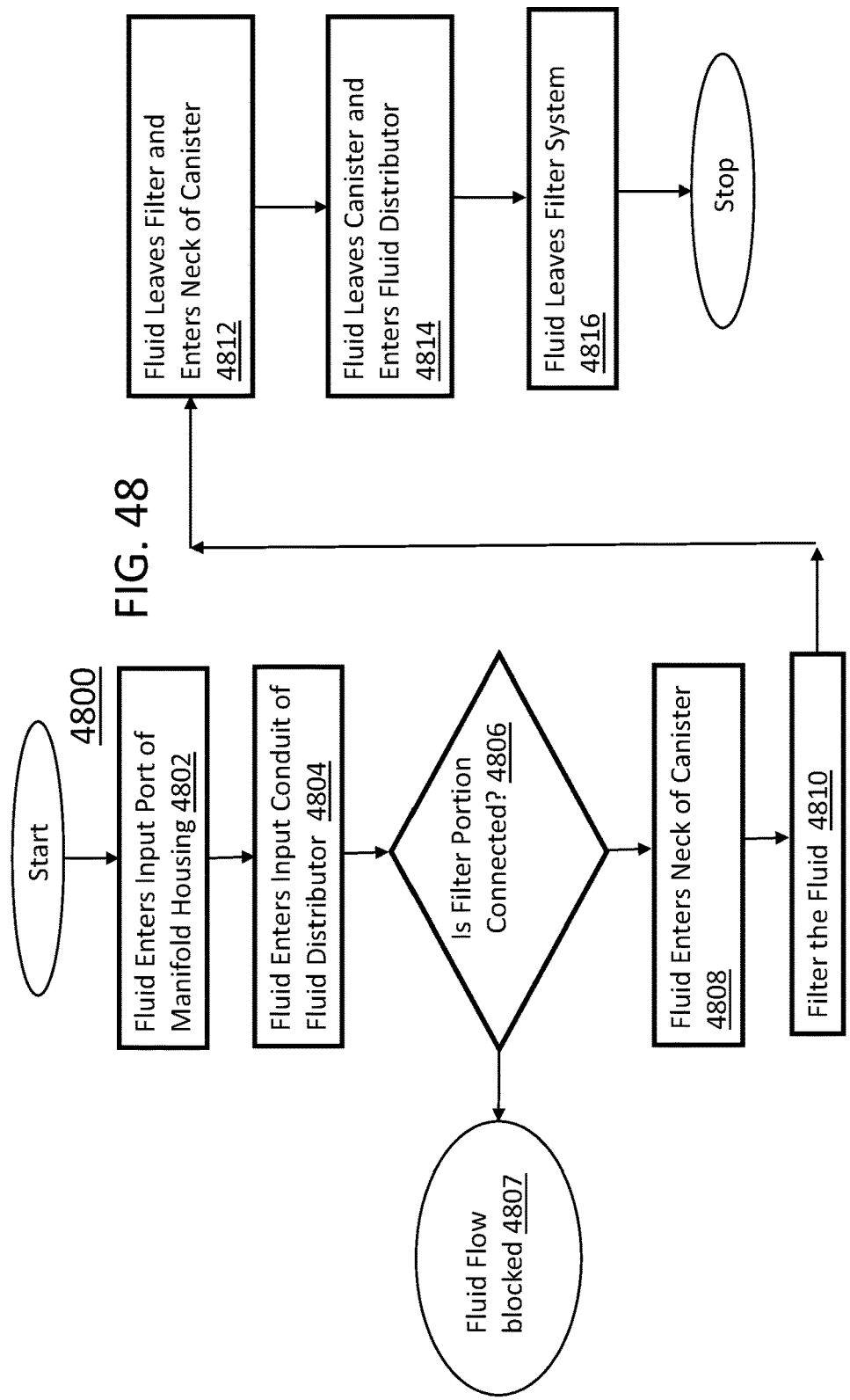
FIG. 48 shows a flowchart of a method using filter system.

FIG. 48 shows a flowchart of a method 4800 using filter system 100. Although method 4800 is not limited by all of the details of method 4800, method 4800 is an embodiment of a method of using the filter of the devices and systems described in FIGS. 1-47 and 49. The description of FIGS. 1-47 and 49 contain various statements about how to use the filter system and about the structure and workings of the filter system 100. The statements in FIGS. 1-47 and 49 about using the filter are further details of embodiments of the method 4800, and the description of filter and the workings of the filter of FIGS. 1-47 and 49 are a description of the structure and workings of an embodiment of the filter system used in method 4800.

In step 4802, fluid from a fluid source, such as a household water supply, enters input port 326.

In step 4804, from input port 326, the fluid flows into valve support 814. Then, since valve support 814 is in input conduit 838. The fluid flows into input conduit 838 and past valve spring 818.

In step 4806, if the filter portion 901 is disconnected, the fluid is stopped at the collar of valve peg 822 and peg ring 824. If the filter portion 901 is connected, the fluid continues to flow past valve peg 822 through peg ring 824 through an opening into a chamber of fluid distributor 835, exterior to conduit divider 850.

In step 4808, the fluid flows from fluid distributor 835 into neck 914 in a region exterior to neck extension 904 and socket 1802, and then into the main body of canister 118 in a region exterior to filter 836.

In step 4810, under the pressure form the incoming fluid, the fluid passes through the walls of filter 836 into filter cavity 838. From filter cavity 838, the water pressure of the incoming water pushes the water into top filter cover 926 and out of the extension 932 of filter cover 926.

In step 4812, from the extension 932 of filter cover 926 the fluid enters socket 1802, and then though neck extension 904.

In step 4814, the fluid coming from neck extension 904, the fluid flows into the chamber formed by fluid divider 850 of fluid distributor 835. The fluid then flows into output conduit 836 passed valve peg 820, peg ring 824, and passed peg spring 814, into valve support 812.

In step 4816, upon leaving valve support 812, the fluid also leaves output conduit 836 and flows into output port 104 to the location where the fluid is used.

In an embodiment, each of the steps of method 4800 is a distinct step. In another embodiment, although depicted as distinct steps in FIG. 48, steps 4802-4816 may not be distinct steps. In other embodiments, method 4800 may not have all of the above steps and/or may have other steps in addition to or instead of those listed above. The steps of method 4800 may be performed in another order. Subsets of the steps listed above as part of method 4800 may be used to form their own method.

Method of Changing Filter

Figure 49:
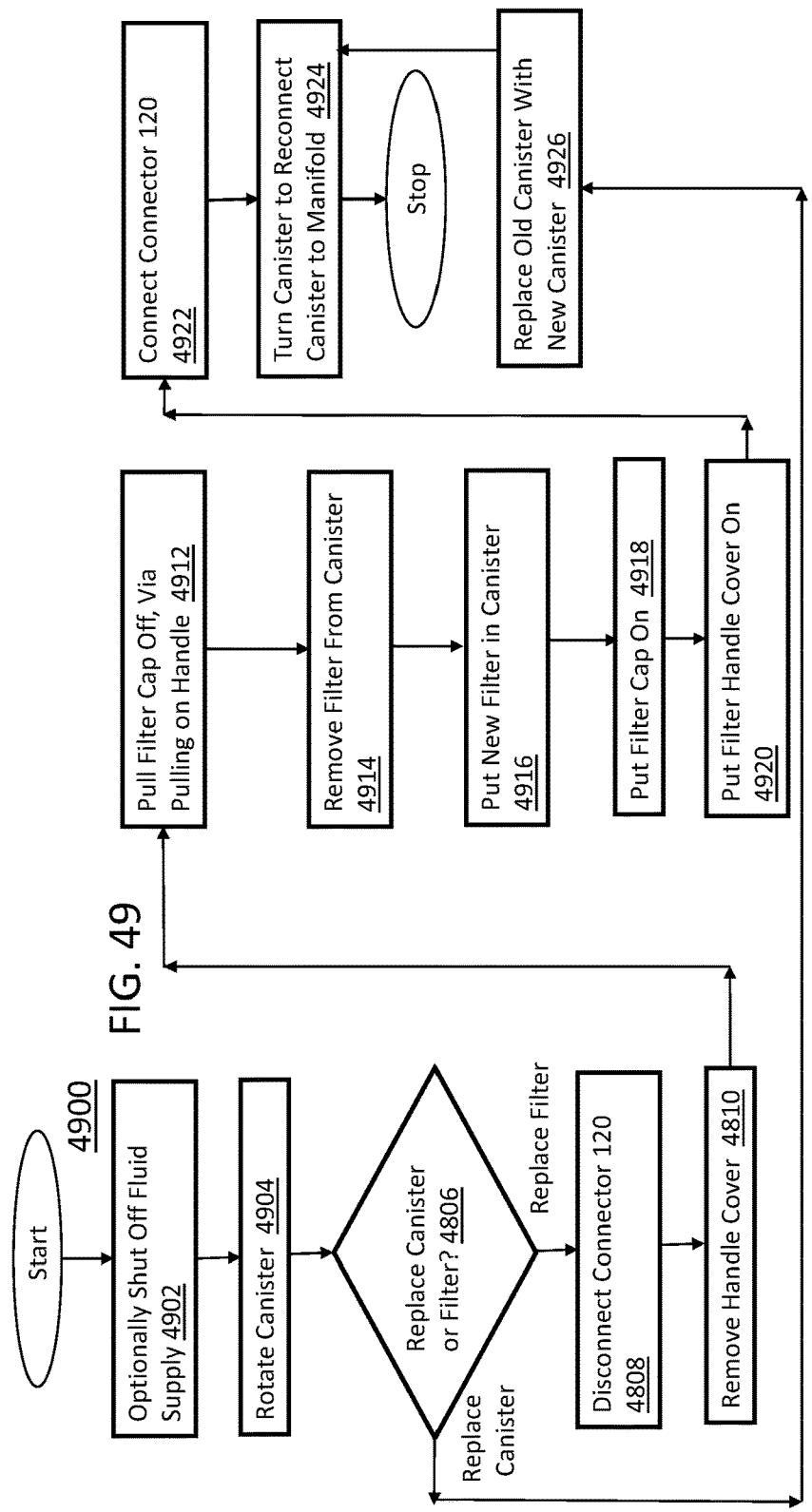
FIG. 49 is a flowchart of a method of changing the filter of the filter system.

FIG. 49 is a flowchart of a method 4900 of changing the filter of filter system 4900. Although the method 4900 is not limited by all of the details of this specification, an embodiment of method 4900 is a method of changing the filter of the devices and systems described in FIGS. 1-48. The description of FIGS. 1-48 contain various statements about how to change the filter of filter system 100 and about the structure and workings of the filter system 100. The statements in FIGS. 1-48 about changing the filter are further details of embodiments of the method 4900, and the description of filter in and the workings of the filter of FIGS. 1-48 are a description of the structure and workings of the filter system used in an embodiment of method 4800.

In optional step 4902, the water supply is shut off.

In step 4904, the canister is rotated relative to the manifold, by turning the handle portion on handle cover 124.

In step 4906, a determination is made whether to replace the entire removable filter portion 901 or whether to just replace filter 936.

If in step 4906, a determination is made to just replace the filter 936, then the method proceeds to step 4908. In step 4908, the connector 120 is removed (e.g., by unscrewing connector 120).

In step 4910, handle cover 124 is removed, such as by pulling off handle cover 124.

In step 4912, bottom cap 940 is removed by pulling on handle 946.

In step 4914, filter 936 is pulled out of canister 118, and optionally filter 936 is removed from filter cap 926.

In step 4916, a new filter 936 and optionally a new filter cap 926 is placed into canister 118.

In step 4918, the bottom cap 940 is placed onto the exposed end of filter 936 (optionally, the filter cap 926 may be placed on filter 936 and then filter 936 is placed into canister 118.

In step 4920, the handle cover 124 is attached to canister 118.

In step 4922, connecter 120 is placed back onto canister 118.

In step 4924, removable filter portion is reattached to the manifold.

Returning to step 4926, if a determination is made to replace the entire removable filter portion, then the method proceeds to step 4926, and a new removable filter portion is obtained, and then form step 4926, method 4900 continues to step 4924. After step 4924, the method 4900 terminates.

In an embodiment, each of the steps of method 4900 is a distinct step. In another embodiment, although depicted as distinct steps in FIG. 49, steps 4902-4926 may not be distinct steps. In other embodiments, method 4900 may not have all of the above steps and/or may have other steps in addition to or instead of those listed above. The steps of method 4900 may be performed in another order. Subsets of the steps listed above as part of method 4900 may be used to form their own method.

Method of Making Filter System 100

FIG. 50 is a flowchart of a method 5000 of making the filter system of FIGS. 1-49. In step 5002, the manifold portion 801 is constructed, which may include Springs 808 and 810 are seated within chambers 3102 and 3140 of base 802. Next, valve supports 812 and 814 supports springs that push pegs into holes in a fluid distributor to create the valves. Valve springs 816 and 818 are attached to valve pegs 820 and 822, at one end and attached to valve supports 816 and 818 at the other end. Then peg rings 824 and 826 are either placed on valve pegs 820 and 822 or placed into input conduit 836 and output port 844, respectively. Next valve springs 816 and 818 and valve pegs 820 and 822 and placed into input conduit 836 and output port 838, and valve supports 816 and 818 are attached to input conduit 836 and output port 838 by sliding tabs 3808 down notches 3502, 3504, 3506, and 3508, and inserting tabs 3808 into slots 840. O-rings 828, 830, 832, and 834 are placed into o-ring grooves 842, 844, 846, and 1002, on an outer surface of input conduit 836 and output conduit 838 of the fluid distributor 835. Input conduit 836 and output port 844 are inserted into input port 326 and output port 104, thereby attaching fluid distributor 835 and manifold 102 to one another. Flanges 804 and 806 are inserted into connector 110, and then rotated to engage flanges 804 and 806, while rotating pegs 108 and 408 into hooks 112 and 114.

Next, in step 5004, removable filter portion 901 is constructed, which may include, placing o-ring 902 in o-ring grove 906 of neck extension 904. Neck extension 904 is attached to one end of socket 1802 in neck 914 of canister 118. O-ring 910 is attached to o-ring groove 912 of neck 914. O-ring 924 is placed on o-ring groove 928 of filter cap 926. A conduit of filter cap 926 is connected to the other end of socket 1802. Filter 936 is placed into canister 118 by connecting filter cavity 938 to extension 932 of filter cap 926. Bottom cap 940 is placed onto the exposed end of filter 936 (optionally, the filter cap 926 may be placed on filter 936 and then filter 936 is placed into canister 118). O-ring 948 is placed on o-ring groove 950 of handle cover 124. Handle cover 124 is attached to canister 118, placing tabs 952 and 2402 into notches 922 and 920, respectively. Connector 120 is connected to (e.g., screwed onto) canister 118.

In step 5006, removable filter portion 801 is attached to manifold portion 901, by turning canister 118 (e.g., via handle portion 126 of handle cover 124).

In an embodiment, each of the steps of method 5000 is a distinct step. In another embodiment, although depicted as distinct steps in FIG. 50, steps 5002-5006 may not be distinct steps. In other embodiments, method 5000 may not have all of the above steps and/or may have other steps in addition to or instead of those listed above. The steps of method 5000 may be performed in another order. Subsets of the steps listed above as part of method 5000 may be used to form their own method.

Alternatives And Extensions

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A filter system comprising:
   a housing for a filter unit that has a first end and a second end, the housing including at least an outlet conduit on the first end and an opening on the second end, the first end of the housing including one or more lugs for detachably engaging the housing with a manifold;
   a removable filter for filtering fluid, the removable filter being enclosed in the filter unit;
   a removable cover; and
   a connector that removably fastens the removable cover to the housing, the connector being detachable from the removable cover and the housing;
   wherein the removable cover is detachable from the opening on the second end of the housing for replacing the removable filter in the filter unit, by detaching the connector;
   the removable cover being accessible for manipulation by hand when the connector is fastening the removable cover to the housing, the removable cover engaging the housing to rotate with the removable cover, such that accessing the removable cover, while the connector is fastening the removable cover to the housing, rotating the removable cover causes the housing to rotate with the removable cover no matter which of two directions of rotation the removable cover is rotated.

2. The filter system of claim 1, the housing having a neck with a rim that has an uneven surface.

3. The filter system of claim 1, the housing having a neck with an undulating surface.

4. The filter system of claim 1 further comprising the manifold, the manifold having an input valve and an output valve, the housing having a neck with at least two raised portions that are aligned with the one or more lugs, such that when connected to the manifold the two raised portions are aligned to open an input valve and an output valve.

5. A filter system comprising:
   a housing for a filter unit that has a first end and a second end, the housing including at least an outlet conduit on the first end and an opening on the second end, the first end of the housing including one or more lugs for detachably engaging the housing with a manifold;
   a removable filter for filtering fluid, the removable filter being enclosed in the filter unit; and
   a removable cap;
   a removable cover covering the cap;
   a connector that removably fastens the removable cap and the removable cover to the housing;
   wherein the removable cap is detachable from the opening on the second end of the housing for replacing the removable filter in the filter unit;
   the one or more lugs each having at least two sloped surfaces, where when connected to the manifold, one of the sloped surfaces faces towards the second end of the housing and the other sloped surface faces away from the second end of the housing, such that one sloped surface of the two sloped surfaces causes the lug to engage the manifold for connecting the housing to the manifold when the housing is moved in one direction, and another sloped surface of the two sloped surfaces causes the lug to engage the manifold for disconnecting the housing from the manifold when the housing is moved in a second direction that is different than the first direction, the at least two sloped surfaces being sloped with respect to, and therefore not parallel to, a plane having a normal that is parallel to an axis extending a length of the housing; and
   the removable cover being accessible for manipulation by hand when the connector is fastening the removable cover to the housing, the removable cover engaging the housing to rotate with the removable cover, such that accessing the removable cover, while the connector is fastening the removable cover to the housing, rotating the removable cover causes the housing to rotate with the removable cover no matter which of two directions of rotation the removable cover is rotated.

6. A filter system comprising:
   a housing for a filter unit that has a first end and a second end, the housing including at least an outlet conduit on the first end and an opening on the second end, the first end of the housing including one or more lugs for detachably engaging the housing with a manifold;
   a removable filter for filtering fluid, the removable filter being enclosed in the filter unit;
   a removable cap;
   a removable cover covering the cap;
   a connector that removably fastens to the filter system and when fastened to the filter systems the connector prevents the removable cap and removable cover from being removed from the housing;
   wherein the removable cap is detachable from the opening on the second end of the housing for replacing the removable filter in the filter unit; the removable cap including at least a handle;
   the removable cover being accessible for manipulation by hand when the connector is fastening the removable cover to the housing, the removable cover engaging the housing to rotate with the removable cover, such that accessing the removable cover, while the connector is fastening the removable cover to the housing, rotating the removable cover causes the housing to rotate with the removable cover no matter which of two directions of rotation the removable cover is rotated.

7. The filter system of claim 6, further comprising a conduit filter cap that is positioned at one end of a removable filter media, the conduit filter cap including at least an outlet conduit that connects with an outlet channel in a housing of a reusable filter system for directing fluid away from the removable filter media, the outlet conduit of the conduit filter cap has a seal between the outlet conduit and the outlet channel to prevent fluid from leaking while traveling from the outlet conduit to the outlet channel.

8. The filter system of claim 6, further comprising a handle cover covering the handle.

9. The filter system of claim 8, the handle cover including at least a handle portion for gripping the handle cover and rotating the filter housing within the manifold to engage and disengage the filter housing from the manifold.

10. The filter system of claim 8, the connector having two open ends, the connector connecting to the housing at a first end of the two open ends of the connector, and the handle portion of the handle cover being accessible, via a second end of the two open ends, for gripping and rotating the housing.

11. The filter system of claim 6, the handle cover having a rim, which when the connector is attached to the filter housing causes the rim of the handle cover to press the filter cover onto the removable filter.

12. The filter system of claim 6, the connector including one or more flanges interior to the connector, which presses down on the handle cover to hold the handle cover on the second end of the housing.

13. The filter of claim 6, the handle cover forming a fluid-tight seal with the housing, preventing fluids from leaking out of the second end of the housing.

14. A filter system comprising:
a housing for a filter unit that has a first end and a second end, the housing including at least an outlet conduit on the first end and an opening on the second end, the first end of the housing including one or more lugs for detachably engaging the housing with a manifold;
a removable filter for filtering fluid, the removable filter being enclosed in the filter unit; and
a removable cap;
a connector that is removable, and when the connector is engaged, the connector prevents the removable cap from being removed from the housing;
wherein the removable-cap is detachable from the opening on the second end of the housing for replacing the removable filter in the filter unit;
the housing having a neck with at least one raised portion that is aligned with the one or more lugs, such that when connected to a manifold the at least one raised portion is aligned to open an input valve and an output valve;
the one or more lugs each having at least two sloped surfaces, where when connected to the manifold, one of the sloped surfaces faces towards the second end of the housing and the other sloped surface faces away from the second end of the housing, such that one sloped surface of the two sloped surfaces causes the lug to engage the manifold for connecting the housing to the manifold when the housing is moved in one direction, and another one sloped surface causes the lug to engage the manifold for disconnecting the housing from the manifold when the housing is moved in a second direction that is different than the first direction, the at least two sloped surfaces being sloped with respect to, and therefore not parallel to, a plane having a normal that is parallel to an axis extending a length of the housing;
the removable cap including at least a handle;
the filter system also including at least
a conduit filter cap that is positioned at one end of a removable filter media, the conduit filter cap including at least an outlet conduit that connects with an outlet channel in the housing of the filter system for directing fluid away from the removable filter media, the outlet conduit of the conduit filter cap has a seal between the outlet conduit and the outlet channel to prevent fluid from leaking while traveling from the outlet conduit to the outlet channel;
a handle cover covering the handle;
the handle cover including at least a handle portion for gripping the handle cover and rotating the filter housing within the manifold to engage and disengage the filter housing from the manifold;
the connector having two open ends, the connector connecting to the housing at a first end of the two open ends of the connector, and the handle portion of the handle cover being accessible, via a second end of the two open ends, for gripping and rotating the filter housing;
the handle cover having a rim, which when the connector is attached to the filter housing causes the rim of the handle cover to press the filter cover onto the removable filter;
the connector including one or more flanges interior to the connector, which press down on the handle cover to hold the handle cover on the second end of the housing;
the handle cover forming a fluid-tight seal with the housing, preventing fluids from leaking out of the second end of the housing;
the handle cover being a removable cover that is accessible for manipulation by hand when the connector is fastening the removable cover to the housing, the removable cover engaging the housing to rotate with the removable cover, such that accessing the removable cover, while the connector is fastening the removable cover to the housing, rotating the removable cover causes the housing to rotate with the removable cover no matter which of two directions of rotation the removable cover is rotated.

15. A filter system for a replaceable filter element, comprising:
a first filter cap that is positioned at one end of a removable filter media, the first filter cap including at least an outlet conduit that connects with an outlet channel in a housing of a reusable filter system for directing fluid away from the removable filter media, the outlet conduit of the filter cap has a seal between the outlet conduit and the outlet channel to prevent fluid from leaking while traveling from the outlet conduit to the outlet channel; and
a second filter cap that is positioned at another end of a removable filter media, the second filter cap including a handle for removing the second filter cap, allowing the filter to be taken from the filter from the housing;
a removable cover that covers the handle blocking access to the handle when the removable cover is attached to the housing;

a housing for housing at least the removable filter media; and a connector that fastens to the housing;

the removable cover being accessible for manipulation by hand when the connector is fastening the removable cover to the housing, the removable cover engaging the housing to rotate with the removable cover, such that accessing the removable cover, while the connector is fastening the removable cover to the housing, rotating the removable cover causes the housing to rotate with the removable cover no matter which of two directions of rotation the removable cover is rotated.

16. A method comprising:

detaching a housing for a filter unit from a manifold, the housing for the filter unit having a first end and a second end, the housing including at least an outlet conduit on the first end and an opening on the second end, the first end of the housing including one or more lugs for detachably engaging the housing with a manifold;

the detaching of the housing from the manifold including at least moving the housing so that the one or more lugs disengage from the manifold;

removing a removable connector from the second end of the housing, therein allowing a handle cover and a removable filter cap to be removed;

removing the handle cover from the second end of the housing, therein uncovering a handle on the removable filter cap;

removing the removable filter cap, via the handle attached to the filter cap from the second end of the housing, the removable filter cap being separable from the connector;

removing a removable filter, from the housing, via the second end;

placing a new removable filter in the housing, via the second end;

covering the new removable filter with the removable filter cap, by placing the removable filter cap at the second end of the housing; and fastening the connector to the housing therein holding the filter and filter cap in place and holding the second end of the housing closed;

the handle cover being a removable cover, the removable cover being accessible for manipulation by hand when the connector is fastening the removable cover to the housing, the removable cover engaging the housing to rotate with the removable cover, such that accessing the removable cover, while the connector is fastening the removable cover to the housing, rotating the removable cover causes the housing to rotate with the removable cover no matter which of two directions of rotation the removable cover is rotated.

17. The filter system of claim 1, the housing having a neck with a circular cross section, and a plane spanning the circular cross section being parallel to the removable cap, and the neck has an opening with a rim that has an uneven surface.

18. The filter system of claim 1, the housing having a neck a circular cross section that is parallel to the removable cap, and the neck has an opening with a rim with an undulating surface.

19. The filter system of claim 1, further comprising the manifold, the manifold having an input valve and an output valve, the housing having a neck with at least two raised portions that are aligned with, and not part of, the one or more lugs, such that when connected to the manifold the two raised portions are aligned to open an input valve and an output valve.

20. The filter system of claim 1, wherein the removable cover engages the housing, via a protrusion that engages a notch, when the removable cover is placed on the housing, as a result of the protrusion and notch, the rotating of the removable cover causes the housing to rotate with the removable cover no matter which of the two directions of rotation the removable cover is rotated.

21. The filter system of claim 1, the housing having a width, a length that is longer than a width, and a central axis that is parallel to the length of the housing; the neck having a central axis that is parallel to the length of the central axis of the housing.

* * * * *